US010339105B2

(12) United States Patent
Saito et al.

(10) Patent No.: US 10,339,105 B2
(45) Date of Patent: Jul. 2, 2019

(54) RELAY SERVER AND STORAGE MEDIUM

(71) Applicant: BROTHER KOGYO KABUSHIKI KAISHA, Nagoya-shi, Aichi-ken (JP)

(72) Inventors: Ken Saito, Tokoname (JP); Masafumi Miyazawa, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 866 days.

(21) Appl. No.: 14/554,566

(22) Filed: Nov. 26, 2014

(65) Prior Publication Data
US 2015/0156255 A1 Jun. 4, 2015

(30) Foreign Application Priority Data

Nov. 29, 2013 (JP) .................................. 2013-247445

(51) Int. Cl.
*G06F 16/16* (2019.01)
*G06F 16/188* (2019.01)
(Continued)

(52) U.S. Cl.
CPC ............. *G06F 16/16* (2019.01); *G06F 3/0481* (2013.01); *G06F 16/192* (2019.01); *G06F 17/30* (2013.01); *G06Q 10/00* (2013.01); *G06Q 10/10* (2013.01)

(58) Field of Classification Search
CPC ........ G06F 17/30; G06F 3/0481; G06F 16/16; G06F 16/192; G06Q 10/00; G06Q 10/10
See application file for complete search history.

(56) References Cited

U.S. PATENT DOCUMENTS 6,427,175 B1 * 7/2002 Khan ................. G06F 17/30884
707/E17.114
6,801,911 B1 * 10/2004 Berstis .............. G06F 17/30876
707/827

(Continued)

FOREIGN PATENT DOCUMENTS

JP 2008234078 A 10/2008
JP 2012-098982 A 5/2012
JP 2013109730 A 6/2013

OTHER PUBLICATIONS

"preferential", Dictionary.com (https://www.dictionary.com/browse/preferentially?s=t) (retrieved on Aug. 1, 2018). (Year: 2018).*

(Continued)

Primary Examiner — James Trujillo
Assistant Examiner — Hubert Cheung
(74) Attorney, Agent, or Firm — Scully, Scott, Murphy & Presser, P.C.

(57) ABSTRACT

A relay server configured to relay service provision from a service provision server to a communication apparatus. The relay server is configured to perform receiving, in a case that a predetermined instruction is provided to the communication apparatus, a request for specific screen data from the communication apparatus, receiving, in a case that the request for the specific screen data is received, first folder relation information related to a first folder, which is a target folder of past data communication, from a database separately configured from the service provision server and the communication apparatus, generating the specific screen data by which a folder name of the first folder received by using the first folder relation information is preferentially displayed on the communication apparatus, and supplying the generated specific screen data to the communication apparatus.

7 Claims, 11 Drawing Sheets

(51) Int. Cl.
  *G06Q 10/00*       (2012.01)
  *G06Q 10/10*       (2012.01)
  *G06F 3/0481*      (2013.01)
  *G06F 17/30*       (2006.01)

(56) References Cited

U.S. PATENT DOCUMENTS

| | | | | |
|---|---|---|---|---|
| 7,689,721 B2* | 3/2010 | Mousseau | ............ | G06Q 10/107 709/248 |
| 2008/0141163 A1* | 6/2008 | Kira | ............ | G06F 3/0482 715/781 |
| 2009/0164637 A1* | 6/2009 | Tanimoto | ............ | H04L 67/104 709/226 |
| 2010/0030921 A1* | 2/2010 | Kim | ............ | G11B 19/025 710/10 |
| 2012/0081743 A1* | 4/2012 | Watanabe | ............ | G06F 17/30899 358/1.15 |
| 2012/0084402 A1* | 4/2012 | Ito | ............ | G06F 17/3089 709/219 |
| 2012/0113469 A1 | 5/2012 | Urakawa | | |
| 2012/0113471 A1* | 5/2012 | Shimada | ............ | G06F 17/30274 358/1.15 |
| 2012/0113472 A1* | 5/2012 | Urakawa | ............ | H04L 67/06 358/1.15 |
| 2012/0117199 A1* | 5/2012 | Nagasaki | ............ | H04L 67/06 709/219 |
| 2012/0117629 A1* | 5/2012 | Miyazawa | ............ | H04L 63/08 726/4 |
| 2012/0254368 A1* | 10/2012 | Sasaki | ............ | H04N 21/234309 709/219 |
| 2013/0135640 A1* | 5/2013 | Nagasaki | ............ | G06F 3/122 358/1.11 |
| 2014/0258349 A1* | 9/2014 | Meltzer | ............ | G06F 17/30194 707/827 |
| 2015/0055177 A1* | 2/2015 | Saito | ............ | G06F 3/1206 358/1.15 |
| 2015/0055178 A1* | 2/2015 | Ishibashi | ............ | G06F 3/1206 358/1.15 |

OTHER PUBLICATIONS

Official Action dated Apr. 25, 2017 received from the Japanese Patent Office in related application 2013-247445.

* cited by examiner

RELAY SERVER AND STORAGE MEDIUM

CROSS-REFERENCE TO RELATED APPLICATIONS

This application claims priority from Japanese Patent Application No. 2013-247445 filed on Nov. 29, 2013, the entire contents of which are incorporated herein by reference.

TECHNICAL FIELD

Aspects of the present invention relate to a relay server for relaying service provision from a service provision server to a communication apparatus.

BACKGROUND

There is known a system including a multifunctional apparatus, a relay server and a service provision server. The multifunctional apparatus displays a screen for receiving a service from the service provision server, in accordance with information obtained from the relay server.

SUMMARY

Aspects of the present invention provide a technology capable of appropriately displaying a screen for receiving a service from a service provision server on a communication apparatus.

According to an aspect of the present invention, there is provided a relay server configured to relay service provision from a service provision server to a communication apparatus, the relay server including: a processor; and a memory storing instructions that, when executed by the processor, cause the relay server to perform: receiving, in a case that a predetermined instruction is provided to the communication apparatus, a request for specific screen data from the communication apparatus through Internet, the specific screen data being data by which one or more selection screens is configured to be displayed on a display unit of the communication apparatus, the one or more selection screens including a screen for enabling selection of a target folder of current data communication, which is to be performed by the communication apparatus so as to receive the service, from a plurality of folders in the service provision server, and each of the plurality of folders in the service provision server being a folder that can be accessed in accordance with specific account information corresponding to a specific user; receiving, in a case that the request for the specific screen data is received, first folder relation information, which is related to a first folder among the plurality of folders, from a database separately configured from the service provision server and the communication apparatus, the first folder being a target folder of past data communication, which was executed by the communication apparatus in the past so as to receive the service in a case that the predetermined instruction was provided to the communication apparatus by the specific user in the past; generating the specific screen data by which a folder name of the first folder received by using the first folder relation information is configured to be preferentially displayed on the display unit of the communication apparatus than a folder name of another folder among the plurality of folders, and supplying the generated specific screen data to the communication apparatus through the Internet.

According to the above configuration, when the relay server receives the request for the specific screen data from the communication apparatus, the relay server receives the first folder relation information related to the first folder, which is the target folder of the past data communication, from the database separately configured from the service provision server and the communication apparatus. Therefore, the relay server can appropriately receive the first folder relation information from the database, without a configuration where the service provision server or the communication apparatus stores folder relation information of past data communication target and can supply the folder relation information to the exterior as required. For this reason, the relay server can generate the specific screen data by which a folder name of the first folder received by using the first folder relation information is configured to be preferentially displayed, and supply the generated specific screen data to the communication apparatus. As a result, the folder name of the first folder can be preferentially displayed on the one or more selection screens displayed on the display unit of the communication apparatus. Therefore, since the specific user can know the folder name of the first folder, which is a target of the past data communication, the specific user can appropriately select a target folder of the current data communication.

A control method, a computer program and a computer-readable storage medium having the computer program recorded therein for implementing the relay server are also novel and useful. Also, a system including the relay server and at least one other apparatus (for example, a communication apparatus, a database and the like) is also novel and useful.

Figure 1:
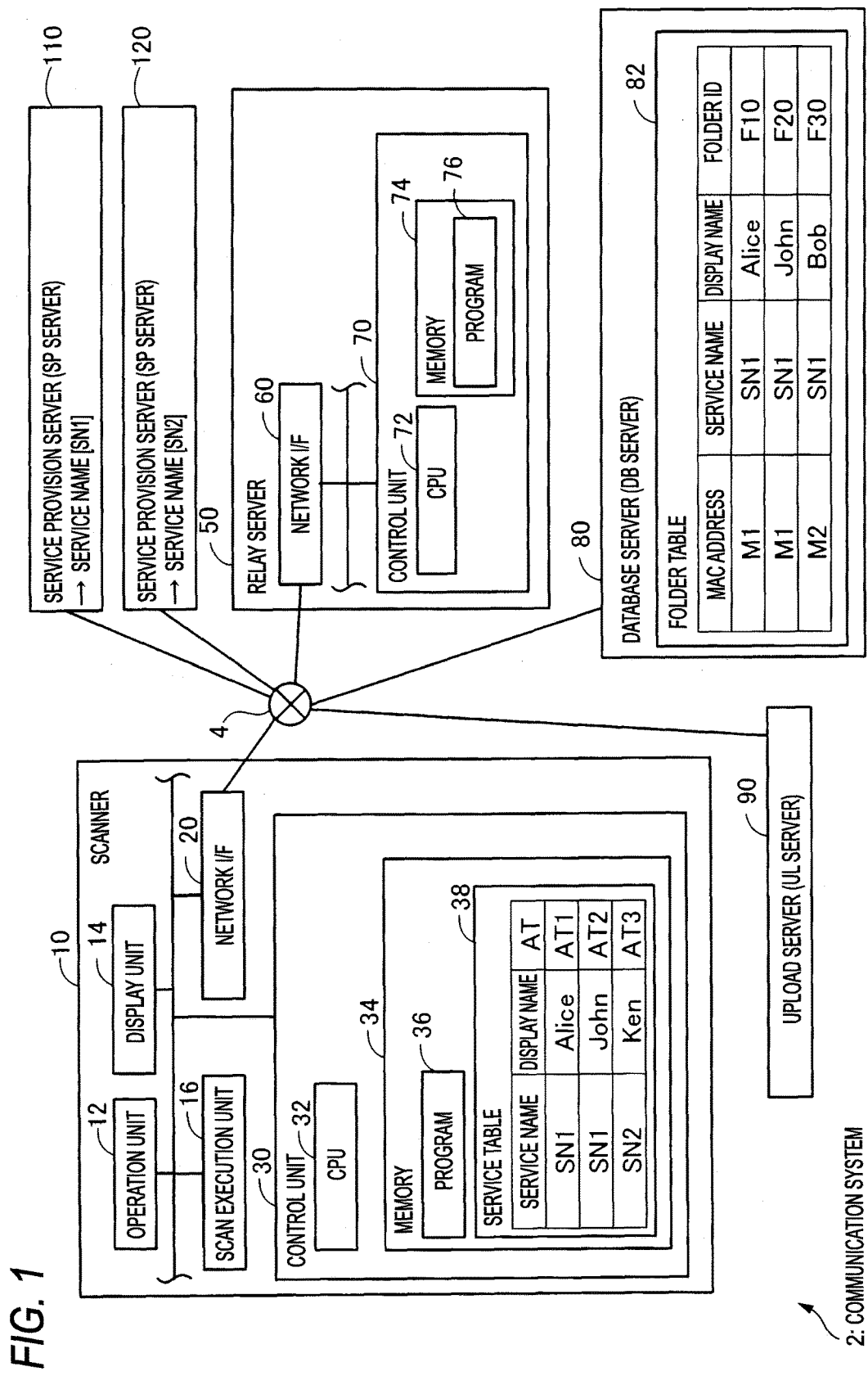
FIG. 1 illustrates a configuration of a communication system.

DETAILED DESCRIPTION (First Illustrative Embodiment)
(Configuration of System)
As shown in FIG. 1, a communication system 2 includes a scanner 10, a relay server 50, a database server (hereinafter, referred to as 'DB server') 80, an upload server (hereinafter, referred to as 'UL server') 90, and a plurality of service provision servers (hereinafter, referred to as 'SP servers') 110, 120. The devices 10, 50, 80, 90, 110, 120 are separately configured.

(Configuration of Scanner 10)

The scanner 10 is a device that is arranged in a LAN (Local Area Network) (not shown), and is a peripheral apparatus such as a PC connected to the LAN.

The scanner 10 has an operation unit 12, a display unit 14, a scan execution unit 16, a network I/F 20 and a control unit 30.

The operation unit 12 has a plurality of keys. A user can input a variety of instructions to the scanner 10 by operating the operation unit 12. The display unit 14 is a display for displaying a variety of information. In this illustrative embodiment, the operation unit 12 and the display unit 14 are separately configured. However, the display unit 14 may be configured to function as a so-called touch panel (i.e., the operation unit 12). The scan execution unit 16 has a scan mechanism such as a CCD, a CIS and the like. The network I/F 20 is an interface for connection to the LAN (not shown). The scanner 10 can be connected to an Internet 4 through the network I/F 20 (i.e., through the LAN).

The control unit 30 has a CPU 32 and a memory 34. The CPU 32 is configured to execute a variety of processing in accordance with a program 36 stored in the memory 34. The memory 34 is configured to store therein a service table 38, in addition to the program 36.

In the service table 38, a plurality of service information is registered. Each service information is information in which a service name, a display name and an access token (which is denoted with 'AT' in FIG. 1 and the like) are associated. The service name is a name of a service that is provided by the SP server (for example, 110). In this illustrative embodiment, the service names of the SP server 110, 120 are 'SN1', 'SN2', respectively. The display name is a name for display determined by a user of the scanner 10. The access token is authentication information for using the SP server (for example, 110).

(Configuration of Relay Server 50)

The relay server 50 is a server that is provided by a vendor of the scanner 10. The relay server 50 is a server for relaying service provision from the respective SP servers 110, 120 to the scanner 10. Specifically, the relay server 50 is configured to perform communication with the respective SP servers 110, 120 in accordance with respective APIs (Application Program Interfaces) corresponding to the respective SP servers 110, 120, thereby executing a variety of data processing.

The relay server 50 has a network I/F 60 and a control unit 70. The relay server 50 can be connected to the Internet through the network I/F 60. The control unit 70 has a CPU 72 and a memory 74. The CPU 72 is configured to execute a variety of processing in accordance with a program 76 stored in the memory 74.

The program 76 in the memory 74 includes a plurality of APIs corresponding to the plurality of SP servers 110, 120. Each of the APIs is a program for performing communication with the SP server (for example, the SP server 110) corresponding to the API, thereby executing data processing. In particular, the API corresponding to the SP server 110 includes a program by which the CPU 72 executes respective processing of FIGS. 3, 4 and 6, which will be described later.

(Configuration of DB Server 80)

The DB server 80 is a server that is provided by the vendor of the scanner 10. The DB server 80 can perform communication with the relay server 50 through the Internet 4. The DB server 80 is configured to store therein a folder table 82.

In the folder table 82, a plurality of folder information is registered. Each folder information is information in which a MAC address, a service name, a display name and a folder ID are associated. The MAC address is a MAC address that is beforehand allotted to the scanner (for example, 10). In this illustrative embodiment, the MAC address of the scanner 10 is 'M1'. The service name and the display name are the same as the service name and the display name to be registered in the service table 38 of the scanner 10. The folder ID is identification information for identifying a folder stored in the service provision server (for example, 110).

(Configuration of UL Server 90)

The UL server 90 is a server that is provided by the vendor of the scanner 10. The UL server 90 is configured to store therein a plurality of APIs corresponding to the plurality of SP servers 110, 120. The UL server 90 uploads data to the SP server (for example, 110) through the Internet 4 when an upload request is received from the scanner 10 through the Internet 4.

(Configuration of SP Servers 110, 120)

Each of the SP servers 110, 120 is a well-known service provision server such as 'Evernote (registered trademark)', 'Google (registered trademark) Docs', 'PICASA (registered trademark)', 'Facebook (registered trademark)' and the like. Each of the SP servers 110, 120 is configured to receive data from the communication device (for example, the scanner 10) through the Internet 4 and to store therein the data. That is, the SP servers 110, 120 can provide a data storage service.

The SP server 110 is a server that is provided by a first provider (i.e., a first company) and the SP server 120 is a server that is provided by a second provider (i.e., a second company) different from the first provider. The providers are different from the vendor of the scanner 10. The first provider discloses a first API for receiving a service from the SP server 110, and the second provider discloses a second API for receiving a service from the SP server 120. Since the first provider and the second provider are different, the first API and the second API are typically different.

The communication device (for example, the scanner 10) needs to have both the first API and the second API so as to directly perform communication with the plurality of SP servers 110, 120 and to thus receive the services. In this case, the communication device should store many programs (i.e., the first and second APIs). However, a storage capacity of the memory 34 of the scanner 10 is smaller than a PC and the like. Therefore, in this illustrative embodiment, the relay server 50 and the UL server 90 are provided so that the scanner 10 can receive the services from the plurality of SP servers 110, 120 without storing many programs.

As described above, the relay server 50 and the UL server 90 have the plurality of APIs corresponding to the plurality of SP servers 110, 120. The relay server 50 is configured to perform various communications (for example, communications such as REQ3 of FIG. 3, REQ10, REQ11 and the like of FIG. 7) with the respective SP servers 110, 120 by using the respective APIs corresponding to the plurality of SP servers 110, 120 so that the scanner 10 can receive the services from the respective SP servers 110, 120. Likewise, the UL server 90 is configured to perform various communications (for example, communication for upload in FIG. 7, which will be described later) with the respective SP servers 110, 120 by using the respective APIs corresponding to the plurality of SP servers 110, 120. Thereby, the scanner 10 can receive the services from the respective SP servers 110, 120 even without having the respective APIs corresponding to the respective SP servers 110, 120 (i.e., even without storing many programs). Also, when the specifications of the SP servers 110, 120 are changed, it is possible to cope with the specification change by changing the programs of the relay server 50 and the UL server 90, without changing the program of the scanner 10. Also, when the programs of the relay server 50 and the UL server 90 are changed to have an API corresponding to a new SP server, the scanner 10 can receive a service from the new SP server, without changing the program of the scanner 10.

(Preparation in Advance by User of Scanner 10)

The user enables the PC (not shown) to execute following operations so that the scanner 10 can receive the service from the SP server 110. In response to a user's instruction, the PC accesses the relay server 50 and receives a URL (Uniform Resource Locator) of the SP server 110 from the relay server 50. The PC accesses the SP server 110 by using the URL. Then, the PC registers user account information (i.e., a user ID and a password) input by the user in the SP server 110.

The SP server 110 generates an access token by using the user account information and supplies the access token to the relay server 50. When the relay server 50 receives the access token from the SP server 110, the relay server 50 generates a temporary ID and supplies the temporary ID to the PC. As a result, the PC displays the temporary ID. Thereby, the user can know the temporary ID.

Subsequently, the user operates the operation unit 12 of the scanner 10 to input the service name 'SN1' of the SP server 110, a desired display name (for example, 'Alice') and the temporary ID to the scanner 10. As a result, the CPU 32 of the scanner 10 supplies the temporary ID to the relay server 50 and receives the access token from the relay server 50. Then, the CPU 32 registers service information in the service table 38. That is, the CPU 32 registers the service information in which the service name 'SN1' input by the user, the display name (for example, 'Alice') input by the user and the access token (for example, 'AT1') received from the relay server 50 are associated.

After the user account information is registered in the SP server 110, the user can generate a folder in the SP server 110 by using the scanner 10, the PC and the like. The user can store a variety of data (i.e., files) in the folder by using the scanner 10, the PC and the like.

Likewise, the registration of the user account information in the SP server 110 and the registration of the service information (for example, 'SN1', 'John', 'AT2') in the service table 38 can be also executed for the other users. Also, the registration of the user account information in the service provision server 120 and the registration of the service information (for example, 'SN2', 'Ken', 'AT3') in the service table 38 can also be executed for the service provision server 120.

Figure 2:
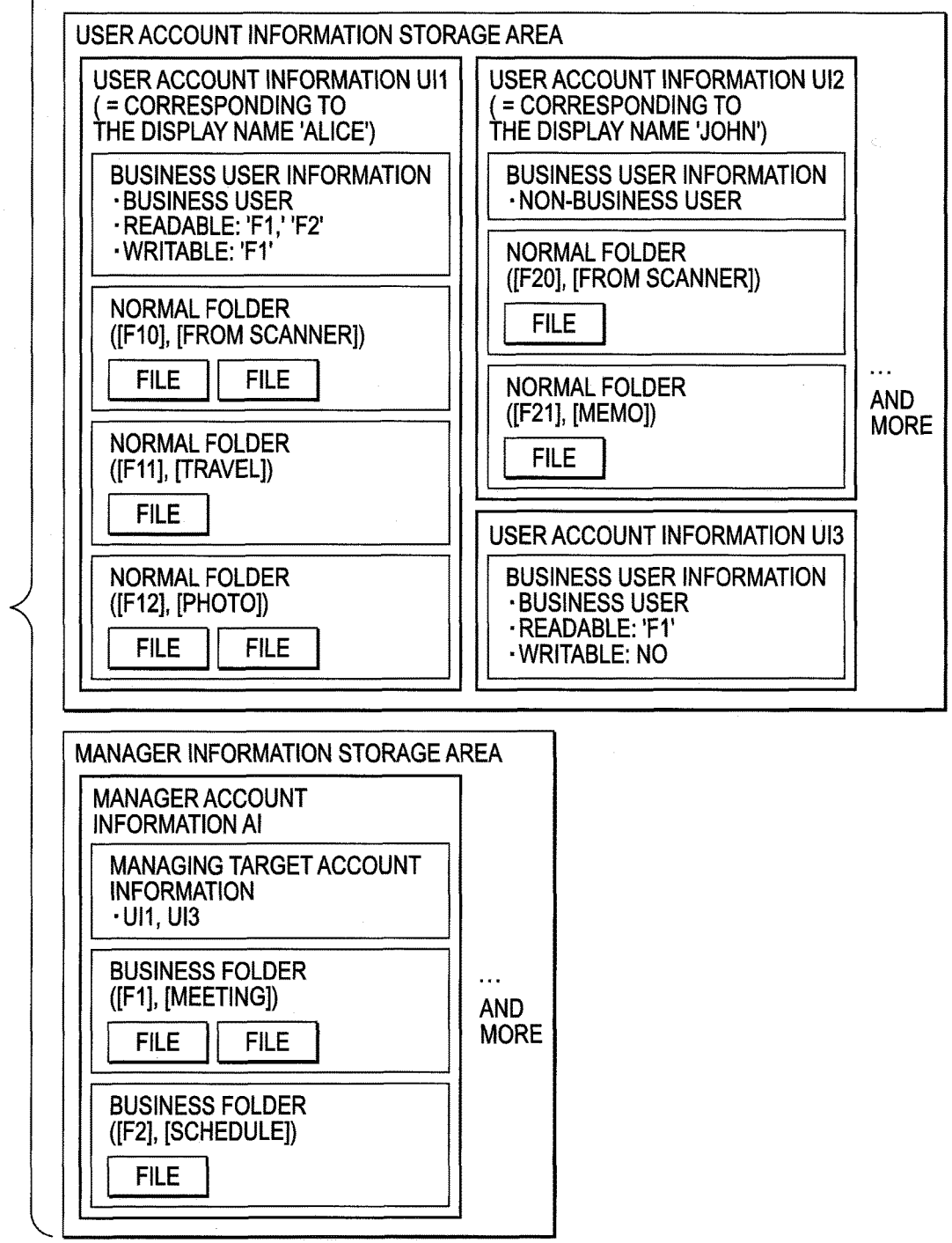
FIG. 2 shows an example of a data structure in a service provision server.

(Data Structure in SP Server 110; FIG. 2)

As shown in FIG. 2, the SP server 110 has a user information storage area and a manager information storage area. The user information storage area is an area for associating and storing user account information, business user information and one or more normal folders for each user account information UI1, UI2, UI3. The manager information storage area is an area for associating and storing managing target account information and one or more business folders for each manager account information AI.

Each user account information UI1, UI2, UI3 is account information for using the SP server 110 by the user, and includes a user ID and a password, for example.

The business user information includes information indicating whether a user is a business user or a non-business user. When the business user information includes the information indicating that a user is a business user, the business user information further includes a folder ID (hereinafter, referred to as 'readable folder ID') of a business folder from which the user can read out data, and a folder ID (hereinafter, referred to as 'writable folder ID') of a business folder to which the user can write data.

The normal folder is a folder that is generated in response to a user's instruction, and is identified by a folder ID (for example, 'F10') and a folder name (for example, 'From Scanner'). The folder ID is a unique ID that is determined by the SP server 110 when a new folder is generated in the SP server 110. The folder name is a name that is arbitrarily determined by an entity (for example, a user, the relay server 50 and the like) instructing generation of a new folder when the new folder is generated in the SP server 110. The normal folder is a folder that is allowed to be accessed in accordance with only the user account information (for example, UI1) for a user instructing generation of the normal folder and is not allowed to be accessed in accordance with another account information.

The manager account information AI is account information for using the SP server 110 by a manager of a company system, and the like, for example, and includes a user ID and a password, for example. The manager buys an authority for receiving manager account information from the first provider managing the SP server 110 and registers the manager account information in the SP server 110 by using the PC and the like (not shown).

The managing target account information is user account information that is designated as a managing target by the manager. In the example of FIG. 2, the respective user account information UI1, UI3 is designated as the managing target account information. With the designation, the respective business user information associated with the respective user account information UI1, UI3 will include the information indicating that the user is the business user.

The business folder is a folder that is generated in response to a manager's instruction, and is identified by a folder ID (for example, 'F1') and a folder name (for example, 'Meeting'). For example, the manager generates a business folder for storing a file to be used for a company business in the SP server 110. Also, the manager can designate, to each business folder, a user (i.e., the user account information) who can read out data from the business folder and a user who can write data to the business folder. With the designation, the respective business user information associated with the respective user account information UI1, UI2, UI3 includes a readable folder ID and a writable folder ID.

For example, the folder ID 'F1' of the business folder having a folder name 'Meeting' is set as the readable folder ID in the respective user account information UI1, UI3. That is, the business folder is a folder that is allowed to be accessed in accordance with the plurality of user account information UI1, UI3.

As described above, the SP server 110 can store the normal folder and the business folder and store data (i.e., a file) in the folders. As the SP server adopting the normal folder and the business folder, 'Evernote (registered trademark)' can be exemplified. In the 'Evernote (registered trademark)', a notebook corresponds to a folder and a note corresponds to a file. In the meantime, the SP server 120 does not store different types of folders such as the normal folder and the business folder.

Figure 3:
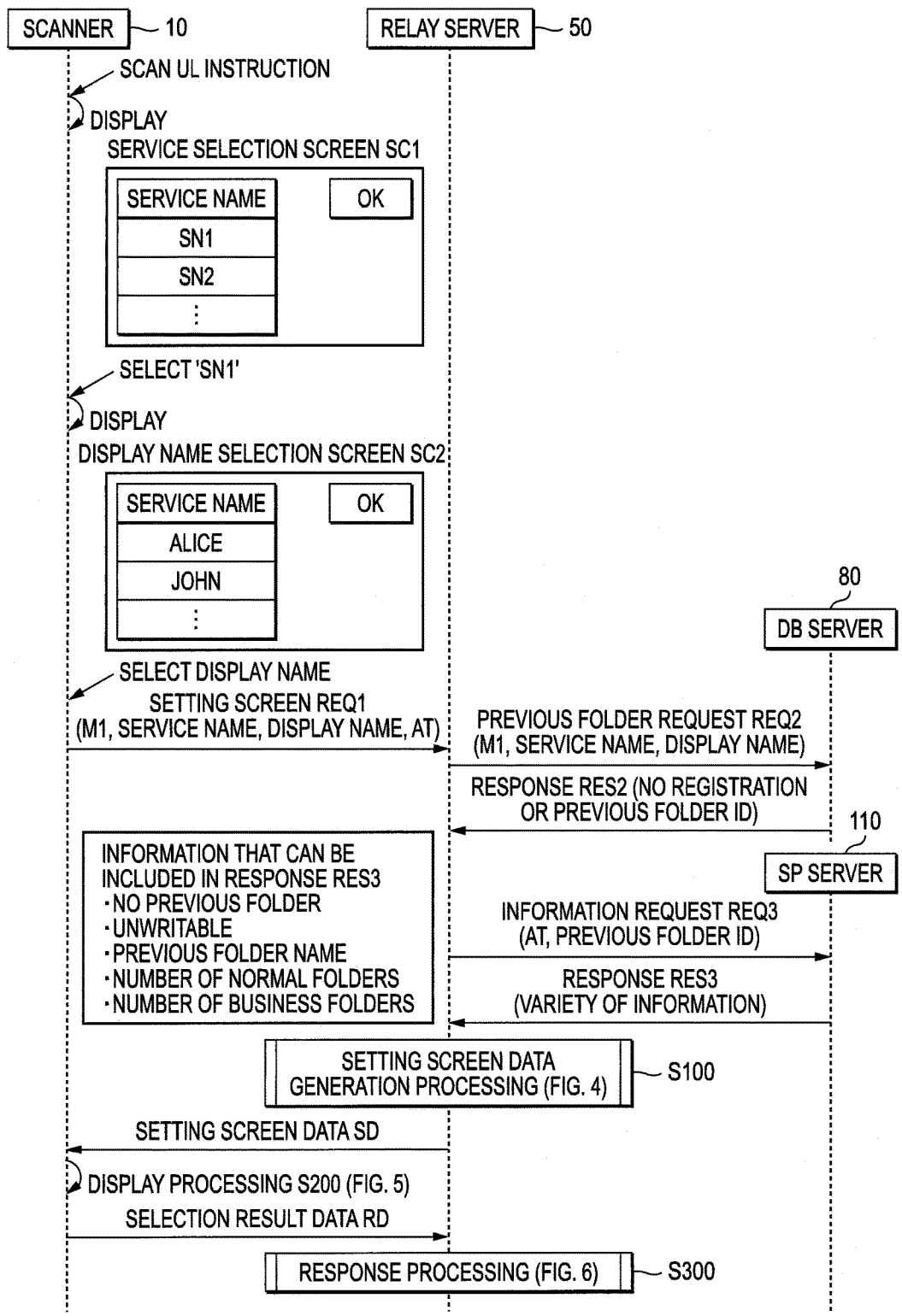
FIG. 3 shows a sequence diagram of each processing that is executed by each device.

(Processing Executed by Scanner 10, Relay Server 50 and the like; FIG. 3)

The scanner 10 can scan a document to generate scan data (i.e., a file) and store the scan data in the memory 34 of the scanner 10 (hereinafter, referred to as 'normal scan') or upload the scan data to the SP servers 110, 120 (hereinafter, referred to as 'scan UL'). Hereinafter, an operation of the scanner 10 for executing the scan UL to the SP server 110 in response to a specific user's instruction will be described. The specific user selects a character string 'scan UL' from a character string 'normal scan' and a character string 'scan UL' on a menu screen displayed on the display unit 14 of the scanner 10. Thereby, a scan UL instruction shown in FIG. 3 is provided to the scanner 10.

When the scan UL instruction is provided to the scanner 10, the CPU 32 of the scanner 10 supplies screen data stored beforehand in the memory 34 to the display unit 14, thereby displaying a service selection screen SC1 on the display unit 14. The service selection screen SC1 includes a plurality of service names 'SN1', 'SN2'. The specific user operates the operation unit 12 to select the service name 'SN1' of the SP server 110 from the plurality of service names.

Then, the CPU 32 of the scanner 10 extracts the respective display names (i.e., 'Alice', 'John') associated with the service name 'SN1' from the service table 38 (see FIG. 1) in the memory 34. Then, the CPU 32 writes the extracted display names in screen data stored beforehand in the memory 34 and supplies the screen data to the display unit 14, thereby displaying a display name selection screen SC2 on the display unit 14. The display name selection screen SC2 includes the plurality of display names 'Alice' and 'John'. The specific user operates the operation unit 12 to select one display name corresponding to the specific user from the plurality of display names. Hereinafter, the selected display name is referred to as 'target display name'.

Subsequently, the CPU 32 of the scanner 10 extracts the access token (for example, 'AT1') associated with the service name 'SN1' and the target display name (for example, 'Alice') from the service table 38 (see FIG. 1) in the memory 34. Hereinafter, the extracted access token is referred to as 'target access token'. Then, the CPU 32 generates a setting screen request REQ1 including the MAC address 'M1' of the scanner 10, the service name 'SN1', the target display name and the target access token. Then, the CPU 32 supplies the setting screen request REQ1 to the relay server 50 through the Internet 4.

When the setting screen request REQ1 is received from the scanner 10, the CPU 72 of the relay server 50 generates a last time folder request REQ2 including the respective information (i.e., 'M1', 'SN1', the target display name) included in the setting screen request REQ1. Then, the CPU 72 supplies the last time folder request REQ2 to the DB server 80 through the Internet 4.

When the last time folder request REQ2 is received from the relay server 50, the DB server 80 extracts a folder ID (for example, 'F10') associated with the respective information in the last time folder request REQ2 from the folder table 82 (see FIG. 1). The extracted folder ID is an ID of a folder that is selected as a target folder of a last time scan UL by the specific user, and is hereinafter referred to as a 'last time folder ID'. Then, the DB server 80 supplies a response RES2 including the last time folder ID to the relay server 50 through the Internet 4. In the meantime, when the last time folder ID associated with the respective information in the last time folder request REQ2 does not exist in the folder table 82, the DB server 80 supplies a response RES2 including information indicating 'no registration' to the relay server 50 through the Internet 4.

When the response RES2 is received from the DB server 80, the CPU 72 of the relay server 50 generates an information request REQ3 including the target access token in the setting screen request REQ1 and the last time folder ID in the response RES2. In the meantime, when the response RES2 includes the information indicating 'no registration', the CPU 72 generates an information request REQ3 not including the last time folder ID. Then, the CPU 72 supplies the information request REQ3 to the SP server 110 through the Internet 4.

When the information request REQ3 is received from the relay server 50, the SP server 110 determines whether there is a normal folder or business folder (hereinafter, referred to as a 'last time folder') having the last time folder ID in the information request REQ3 by referring to the user information storage area and manager information storage area (see FIG. 2). When it is determined that there is no last time folder, the SP server 110 generates a response RES3 including information indicating 'no last time folder'.

Also, the SP server 110 specifies the user account information (hereinafter, referred to as 'target user account information') corresponding to the target access token in the information request REQ3. As described above, the access token is generated on the basis of the user account information. Therefore, the SP server 110 can specify the target user account information from the target access token.

Subsequently, when it is determined that there is a last time folder, the SP server 110 determines whether the user corresponding to the target user account information can write a file in the last time folder. Specifically, when the last time folder is a normal folder associated with the target user account information, the SP server 110 determines that a file can be written in the last time folder. When the last time folder is a business folder, the SP server 110 refers to the business user information (see FIG. 2) associated with the target user account information. When the last time folder ID is written as the writable folder ID, the SP server 110 determines that a file can be written in the last time folder. For the other cases, the SP server 110 determines that a file cannot be written in the last time folder. When it is determined that a file can be written, the SP server 110 generates a response RES3 including a last time folder file name (hereinafter, referred to as a 'last time folder name'). When it is determined that a file cannot be written, the SP server 110 generates a response RES3 including information indicating 'unwritable'.

Also, the SP server 110 specifies a number of the normal folders associated with the target user account information. Further, when the business user information associated with the target user account information indicates a non-business user, the SP server 110 further determines '0', as the number of the business folders. Also, when the business user information indicates a business user, the SP server 110 specifies numbers of the readable folder IDs and writable folder IDs included in the business user information, thereby determining the number of the business folders. Then, the SP server 110 generates a response RES3 including the number of normal folders and the number of business folders. The SP server 110 supplies the response RES3 to the relay server 50 through the Internet 4.

When the response RES3 is received from the SP server 110, the CPU 72 of the relay server 50 executes setting screen data generation processing of S100 (see FIG. 4, which will be described later), thereby generating a setting screen data SD. Then, the CPU 72 supplies the setting screen data SD to the scanner 10 through the Internet 4.

When the setting screen data SD is received from the relay server 50, the CPU 32 of the scanner 10 displays one or more selection screens (see FIG. 5, which will be described later) on the display unit 14 by using the setting screen data SD. The specific user operates the operation unit 12 to execute a selection in accordance with the one or more selection screens. In this case, the CPU 32 supplies selection result data RD to the relay server 50 through the Internet 4.

When the selection result data RD is received from the scanner 10, the CPU 72 of the relay server 50 executes response processing of S300 (see FIG. 6, which will be described later) by using the selection result data RD.

Figure 4:
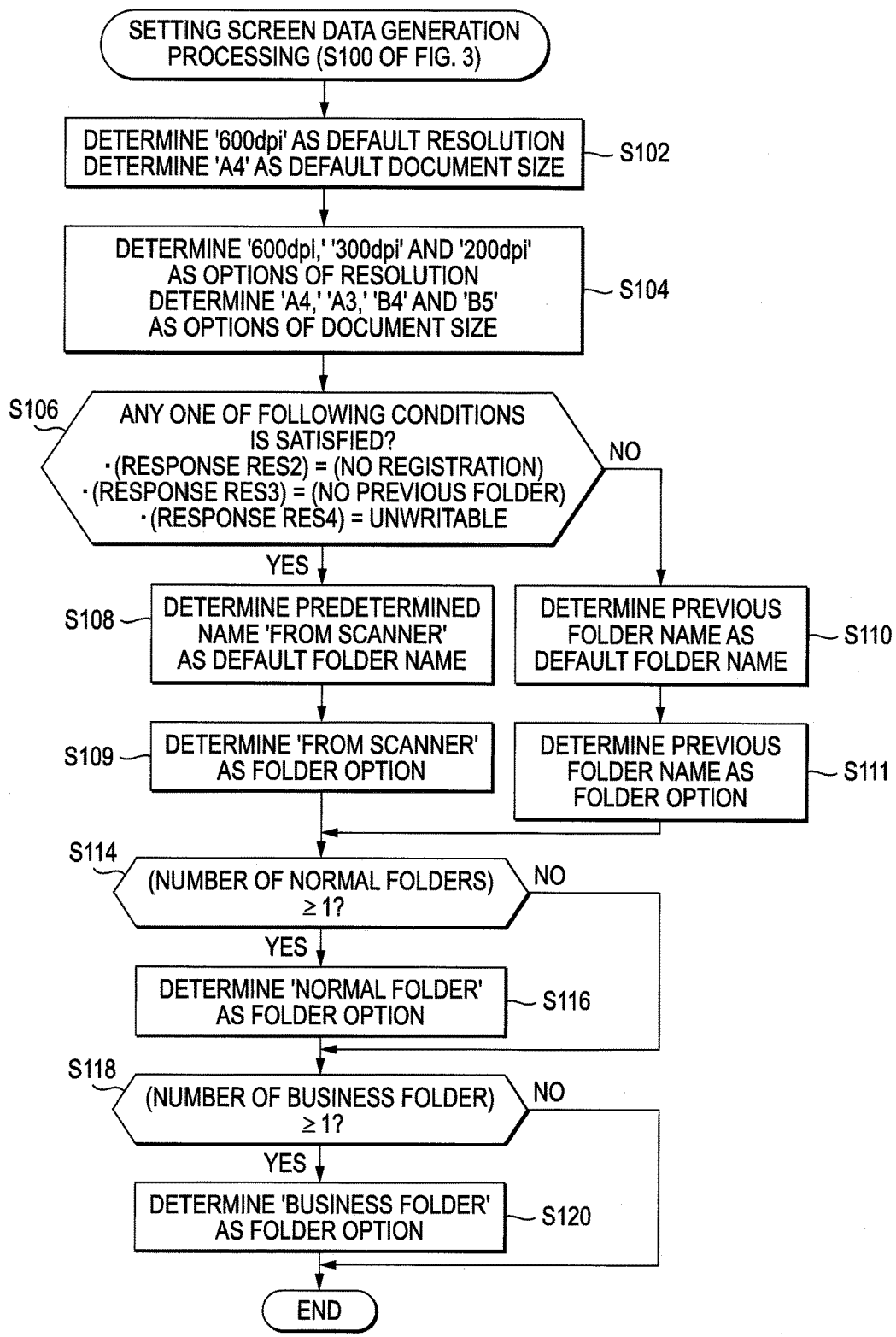
FIG. 4 is a flowchart showing setting screen data generation processing in a relay server.

(Setting Screen Data Generation Processing; FIG. 4)

Subsequently, the setting screen data generation processing of S100 shown in FIG. 3 is described with reference to FIG. 4. In S102, the CPU 72 of the relay server 50 determines a preset value '600 dpi' as a default resolution, and determines a preset value 'A4' as a default document size.

In S104, the CPU 72 determines three preset values '600 dpi', '300 dpi' and '200 dpi' as options of the resolution, and determines four preset values 'A4', 'A3', 'B4' and 'B5' as options of the document size.

In S106, the CPU 72 executes the following processing on the basis of the information included in the response RES2 and the response RES3 (see FIG. 3). When the response RES2 includes the information indicating 'no registration' (YES in S106), the CPU 72 proceeds to S108. When the response RES2 does not include the information indicating 'no registration', i.e., the response RES2 includes the last time folder ID, the CPU 72 further determines whether the response RES3 includes the information indicating 'no last time folder' or 'unwritable'. When the response RES3 includes the information indicating 'no last time folder' or 'unwritable' (YES in S106), the CPU 72 proceeds to S108. When the response RES3 does not include the information indicating 'no last time folder' or 'unwritable' (NO in S106), i.e., the response RES3 includes the last time folder name, the CPU 72 proceeds to S110.

In S108, the CPU 72 determines a preset character string 'From Scanner', as a default folder name. Then, in S109, the CPU 72 determines the preset character string 'From Scanner', as a folder option. When the processing of S109 is over, the CPU 72 proceeds to S114.

In S110, the CPU 72 determines a character string of the last time folder name in the response RES3, as a default folder name. Then, in S111, the CPU 72 determines the character string of the last time folder name in the response RES3, as a folder option. When the processing of S111 is over, the CPU 72 proceeds to S114.

In S114, the CPU 72 determines whether the number of normal folders in the response RES3 is equal to or larger than '1'. When the number of normal folders is equal to or larger than '1' (YES in S114), the CPU 72 determines a character string 'Normal Folder' as a folder option in S116 and then proceeds to S118. On the other hand, when it is determined that the number of normal folders is '0' (NO in S114), the CPU 72 skips over S116 and proceeds to S118.

In S118, the CPU 72 determines whether the number of business folders in the response RES3 is equal to or larger than '1'. When the number of business folders is equal to or larger than '1' (YES in S118), the CPU 72 determines a character string 'Business Folder' as a folder option in S120. On the other hand, when the number of business folders is '0' (NO in S118), the CPU 72 skips over S120.

The CPU 72 generates the setting screen data SD by determining the various values and the character strings. The setting screen data SD includes last time information, default information, folder option information, resolution option information and document size option information (see FIG. 5). The last time information is information indicating whether or not to preferentially display the last time folder name on the scanner 10, and indicates 'there is no last time folder' when S108 and S109 of FIG. 4 are executed and indicates 'there is a last time folder' when S110 and S111 are executed. When the last time information indicates 'there is a last time folder', the last time information further includes the last time folder ID included in the response RES2 of FIG. 3 and the last time folder name included in the response RES3. The default information includes the respective values (i.e., the default resolution and the default document size) determined in S102 and the character string (i.e., the default folder name) determined in S108 or S110. The folder option information includes at least the character string determined in S109 or S111, and further includes the character string 'Normal Folder' when S116 is executed and further includes the character string 'Business Folder' when S120 is executed. The resolution option information includes three values related to the resolution determined in S104. Also, the document size option information includes four values related to the document size determined in S104. The setting screen data SD is supplied from the relay server 50 to the scanner 10 (see FIG. 3).

Figure 5:
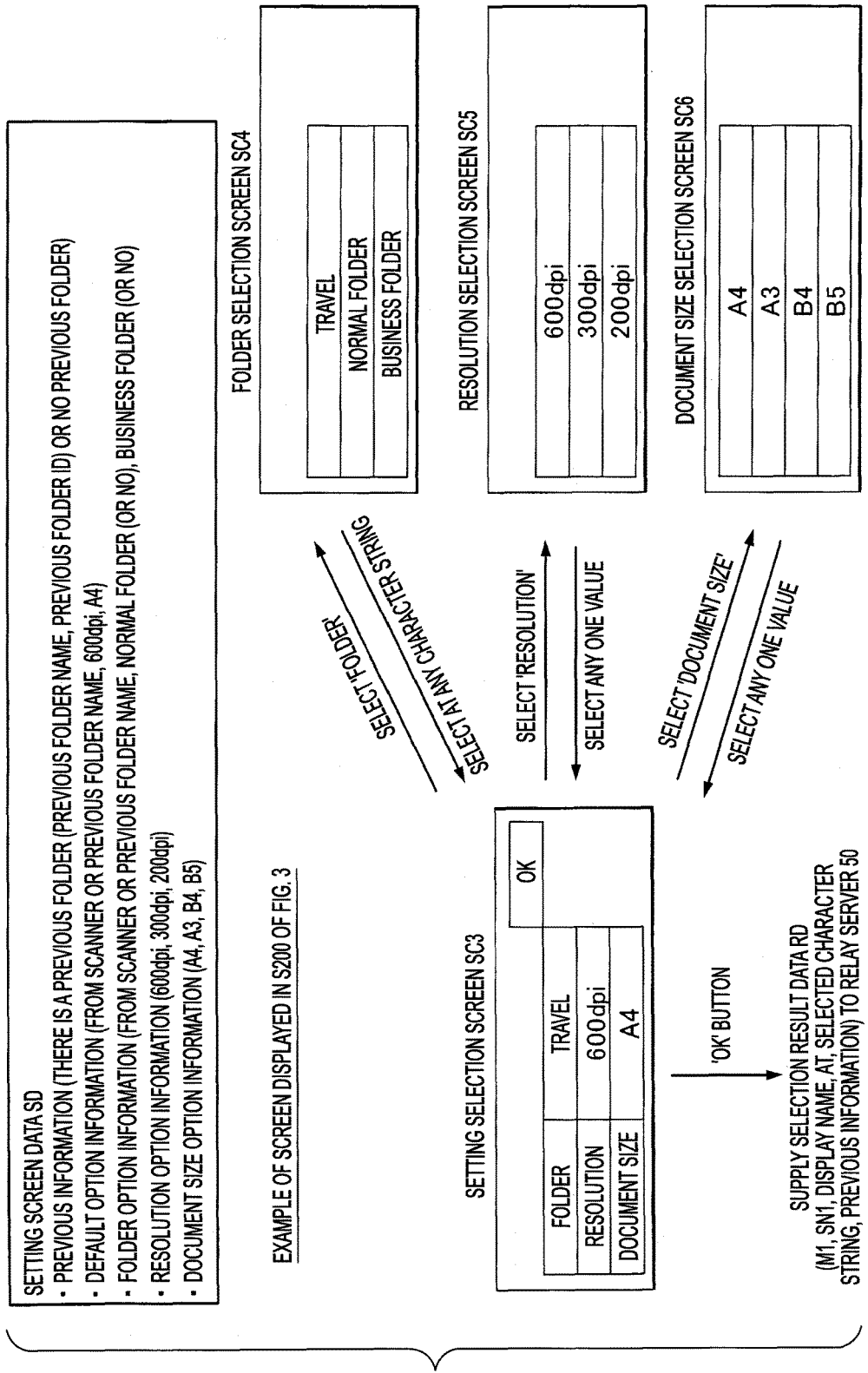
FIG. 5 shows an example of each screen that is displayed on a scanner.

(Screen Displayed on Scanner 10; FIG. 5)

Subsequently, each selection screen displayed in S200 of FIG. 3 will be described with reference to FIG. 5. Each selection screen is a screen for selecting a setting for the scan UL by the specific user. Specifically, the specific user can select a folder of an upload destination of the scan data (i.e., a file), the scan resolution that should be used by the scan execution unit 16, and the document size of the scan target in accordance with each selection screen. Hereinafter, each selection screen will be described with reference to an example where the target display name is 'Alice' corresponding to the user account information UI1 (see FIG. 2).

When the setting screen data SD is received from the relay server 50, the CPU 32 of the scanner 10 writes the respective information, which is included in the default information in the setting screen data SD, in template data stored beforehand in the memory 34, thereby generating setting selection screen data. Then, the CPU 32 supplies the setting selection screen data to the display unit 14, thereby displaying a setting selection screen SC3 on the display unit 14.

The setting selection screen SC3 includes a default folder name 'Travel' as an item 'folder', a default resolution '600 dpi' as an item 'resolution' and a default document size 'A4' as an item 'document size'. In the example of FIG. 5, the default folder name is the last time folder name 'Travel' (see S110 of FIG. 4). Like this, the last time folder name is displayed and the other folder names (for example, 'From Scanner', 'Photo') are not displayed on the setting selection screen SC3. That is, the last time folder name is preferentially displayed than the other folder names. For this reason, the specific user can know the last time folder name by seeing the setting selection screen SC3.

When the specific user wants to select a folder name different from the folder name displayed on the setting selection screen SC3, the specific user operates the operation unit 12 to select an item 'folder' included in the setting selection screen SC3. In this case, the CPU 32 writes the respective information (in the example of FIG. 5, 'Travel', 'Normal Folder', 'Business Folder'), which is included in the folder option information in the setting screen data SD, in the template data, thereby generating folder selection screen data. Then, the CPU 32 supplies the folder selection screen data to the display unit 14, thereby displaying a folder setting selection screen SC4 on the display unit 14. The specific user can select a character string corresponding to the desired folder by operating the operation unit 12. When any one character string is selected from the folder setting selection screen SC4, the CPU 32 displays a new setting selection screen SC3 including the character string (for example, 'Normal Folder') selected as the item 'folder' on the display unit 14. In the meantime, the character string 'Normal Folder' or 'Business Folder' is an option for selecting a folder on a list screen (for example, SC7 of FIG. 9, SC8 of FIG. 10) which is displayed after an OK button is selected on the setting selection screen SC3. The details of the list screen will be described later.

Also, when the specific user wants to select a resolution different from the resolution displayed on the setting selection screen SC3, the specific user operates the operation unit 12 to select the item 'resolution' included in the setting selection screen SC3. In this case, the CPU 32 writes the respective information, which is included in the resolution option information in the setting screen data SD, in the template data, thereby generating resolution selection screen data. Then, the CPU 32 supplies the resolution selection screen data to the display unit 14, thereby displaying a resolution selection screen SC5 on the display unit 14. The specific user can select a value corresponding to the desired resolution by operating the operation unit 12. When any one value is selected on the resolution selection screen SC5, the CPU 32 displays a new setting selection screen SC3 including a value (for example, '300 dpi') selected as the item 'resolution' on the display unit 14.

Also, when the specific user wants to select a document size different from the document size displayed on the setting selection screen SC3, the specific user operates the operation unit 12 to select the item 'document size' included in the setting selection screen SC3. In this case, the CPU 32 writes the respective information, which is included in the document size option information in the setting screen data SD, in the template data, thereby generating document size selection screen data. Then, the CPU 32 supplies the document size selection screen data to the display unit 14, thereby displaying a document size setting selection screen SC6 on the display unit 14. The specific user can select a value corresponding to the desired document size by operating the operation unit 12. When any one value is selected on the document size setting selection screen SC6, the CPU 32 displays a new setting selection screen SC3 including a value (for example, 'A3') selected as the item 'document size' on the display unit 14.

When the specific user is satisfied with the contents of the respective items displayed on the setting selection screen SC3, the specific user selects an OK button in the setting selection screen SC3 by operating the operation unit 12. In this case, the CPU 32 generates selection result data RD and supplies the selection result data RD to the relay server 50 (see FIG. 3). The selection result data RD includes the MAC address 'M1' of the scanner 10, the service name 'SN1' of the SP server 110, the target display name (for example, 'Alice'), the target access token (for example, 'AT1'), a character string (hereinafter, referred to as 'selected character string') of the item 'folder' displayed when the OK button in the setting selection screen SC3 of FIG. 5 is selected and last time information. The last time information is the same information as the last time information in the setting screen data SD.

Figure 6:
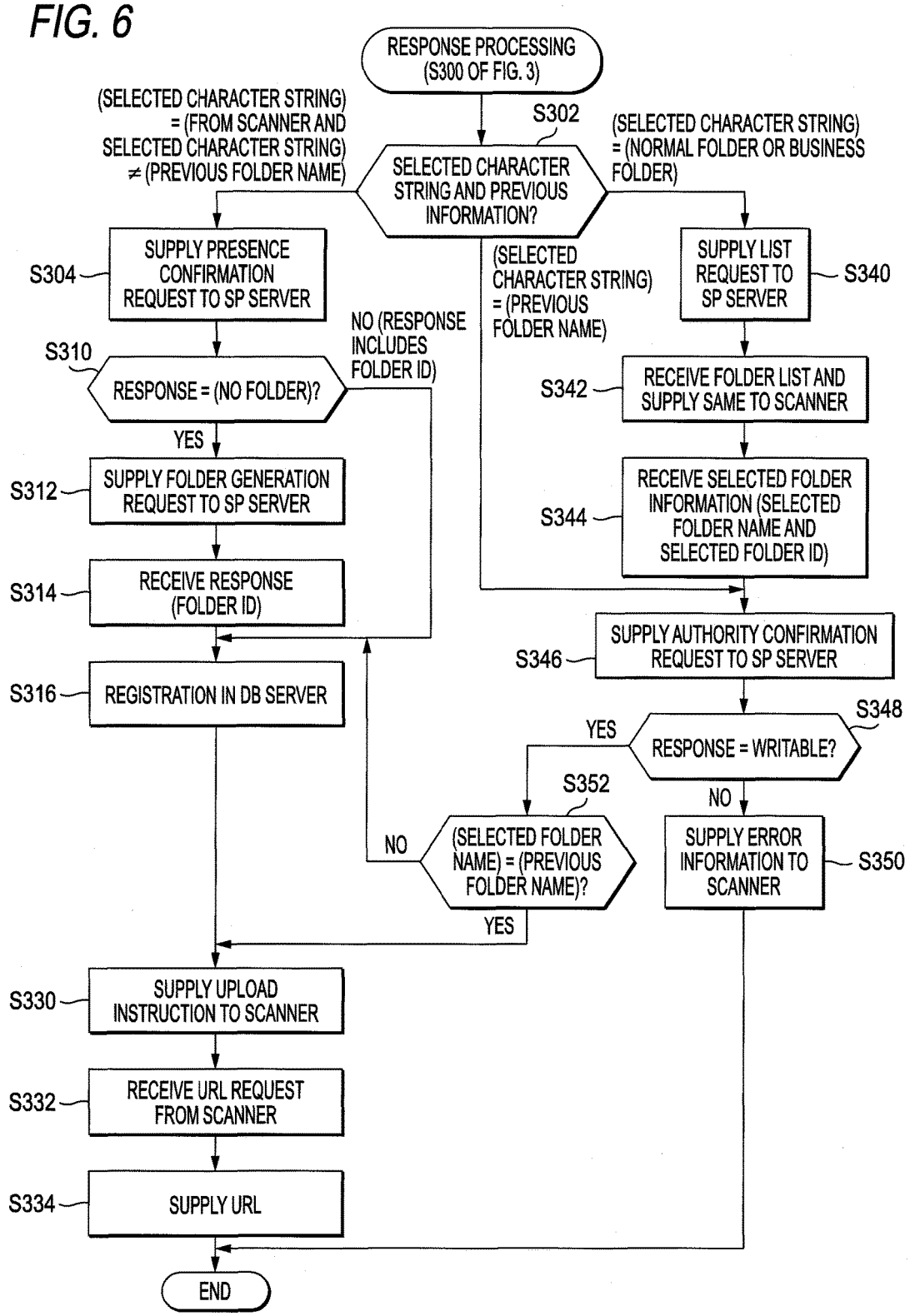
FIG. 6 is a flowchart of response processing in the relay server.

(Response Processing; FIG. 6)

Subsequently, the response processing of S300 of FIG. 3 will be described with reference to FIG. 6. In S302, the CPU 72 of the relay server 50 checks the selected character string and last time information in the selection result data RD and then executes following processing. When the selected character string is 'From Scanner' and the selected character string does not coincide with the last time folder name, the CPU 72 proceeds to S304. Also, when the selected character string is 'Normal Folder' or 'Business Folder', the CPU 72 proceeds to S340, irrespective of the content of the last time information. When the selected character string coincides with the last time folder name, the CPU 72 proceeds to S346.

In S304, the CPU 72 supplies a presence confirmation request to the SP server 110 through the Internet 4. The presence confirmation request is a command for confirming whether there is a folder having the selected character string 'From Scanner' as a folder name, and includes the target access token in the selection result data RD and the selected character string 'From Scanner' in the selection result data RD.

When the presence confirmation request is received from the relay server 50, the SP server 110 specifies the target user account information corresponding to the target access token. Then, the SP server 110 determines whether there is a normal folder having a folder name 'From Scanner' in the respective normal folders associated with the target user account information. When it is determined that there is no normal folder, the SP server 110 supplies a response including the information indicating 'no folder' to the relay server 50 through the Internet 4. On the other hand, when it is determined that there is the normal folder, the SP server 110 supplies a response including the folder ID of the normal folder to the relay server 50 through the Internet 4.

When the response is received from the SP server 110, the CPU 72 of the relay server 50 determines in S310 whether the response includes the information indicating 'no folder'. When the response includes the information indicating 'no folder' (YES in S310), the CPU 72 proceeds to S312. Also, when the response does not include the information indicating 'no folder' (NO in S310), i.e., when the response includes the folder ID, the CPU 72 proceeds to S316.

In S312, the CPU 72 supplies a folder generation request to the SP server 110 through the Internet 4. The folder generation request is a command for requesting generation of a normal folder having a folder name 'From Scanner', and includes the target access token and the selected character string 'From Scanner'.

When the folder generation request is received from the relay server 50, the SP server 110 specifies the target user account information corresponding to the target access token. Then, the SP server 110 generates a normal folder having a folder name 'From Scanner' in association with the target user account information. At this time, the SP server 110 newly determines the folder ID of the normal folder (hereinafter, referred to as 'first folder ID'). Then, the SP server 110 supplies a response including the first folder ID to the relay server 50 through the Internet 4.

In S314, the CPU 72 of the relay server 50 receives the response including the first folder ID from the SP server 110.

Then, in S316, the CPU 72 supplies a registration request to the DB server 80 through the Internet 4. The registration request is a command for requesting new registration of the folder ID, and includes the respective information (i.e., 'M1', 'SN1', the target display name) in the selection result data RD and the first folder ID received in S314.

When the registration request is received from the relay server 50, the DB server 80 determines whether folder information (hereinafter, referred to as 'target folder information') corresponding to the respective information (i.e., 'M1', 'SN1', the target display name) in the registration request exists in the folder table 82 (see FIG. 1). When it is determined that the target folder information exists in the folder table 82, the DB server 80 newly registers the folder ID (i.e., 'the first folder ID') in the registration request, instead of the folder ID included in the target folder information. On the other hand, when it is determined that the target folder information does not exist in the folder table 82, the DB server 80 newly registers the folder information, which includes the respective information (i.e., 'M1', 'SN1', the target display name, the first folder ID) in the registration request, in the folder table 82.

In S330, the CPU 72 of the relay server 50 supplies an upload instruction to the scanner 10 through the Internet 4. The upload instruction is an instruction for executing scan and upload operations and includes the first folder ID received in S314.

When the upload instruction is received from the relay server 50, the CPU 32 of the scanner 10 scans a document in accordance with the respective values (for example, '600 dpi', 'A4') of the respective items 'resolution' and 'document size' displayed when the OK button in the setting selection screen SC3 of FIG. 5 is selected, thereby generating scan data. Then, the CPU 32 supplies a URL request to the relay server 50 through the Internet 4.

In S332, the CPU 72 of the relay server 50 receives the URL request from the scanner 10. In this case, in S334, the CPU 72 supplies a response including a URL of the UL server 90 stored beforehand in the memory 74 to the scanner 10 through the Internet 4. When the processing of S334 is over, the processing of FIG. 6 is over.

When the response is received from the relay server 50, the CPU 32 of the scanner 10 accesses the UL server 90 by using the URL in the response. Specifically, the CPU 32 supplies an upload request to the UL server 90 through the Internet 4. The upload request is a command for requesting an upload of the scan data, and includes the service name 'SN1' of the SP server 110, the target access token, the first folder ID and the scan data.

When the upload request is received from the scanner 10, the UL server 90 uploads the scan data included in the upload request to the SP server 110 through the Internet 4. Specifically, the UL server 90 supplies the respective information (i.e., the target access token, the first folder ID and the scan data) in the upload request to the SP server 110. As a result, in the SP server 110, the scan data (i.e., a file) is stored in the folder having the first folder ID (i.e., in the normal folder having the folder name 'From Scanner').

When the response to the presence confirmation request includes a folder ID (hereinafter, referred to as 'second folder ID') (NO in S310), the respective processing of S316 and thereafter is executed. The respective processing is the same as the above processing, except that the second folder ID is used instead of the first folder ID.

Also, when the selected character string in the selection result data RD is 'Normal Folder' or 'Business Folder', the CPU 72 supplies a list request to the SP server 110 through the Internet 4, in S340. The list request includes the target access token and the selected character string 'Normal Folder' or 'Business Folder'.

When the list request is received from the relay server 50, the SP server 110 specifies the target user account information corresponding to the target access token. When the selected character string in the list request is 'Normal Folder', the SP server 110 generates a folder list related to the normal folder. The folder list includes folder information associated with the folder ID and folder name of the normal folder for each normal folder associated with the target user account information. Also, when the selected character string in the list request is 'Business Folder', the SP server 110 generates a folder list related to the business folder. The folder list includes folder information associated with the folder ID and folder name of the business folder for each business folder (i.e., the readable folder ID and writable folder ID in the business user information (see FIG. 2)) associated with the target user account information. Then, the SP server 110 supplies the folder list to the relay server 50 through the Internet 4.

In S342, when the folder list is received from the SP server 110, the CPU 72 of the relay server 50 supplies the folder list to the scanner 10 through the Internet 4.

When the folder list is received from the relay server 50, the CPU 32 of the scanner 10 writes the respective folder names in the folder list in the template data, thereby generating list screen data. Then, the CPU 32 supplies the list screen data to the display unit 14, thereby displaying a list screen (for example, a list screen SC7 of FIG. 9, which will be described later) on the display unit 14. The specific user can select a folder name corresponding to the desired folder by operating the operation unit 12. Hereinafter, the folder name selected here is referred to as a 'selected folder name', the folder ID corresponding to the selected folder name is referred to as a 'selected folder ID', and the selected folder name and the selected folder ID are collectively referred to as 'selected folder information'. Then, the CPU 32 supplies the selected folder information to the relay server 50 through the Internet 4.

In S344, the CPU 72 of the relay server 50 receives the selected folder information from the scanner 10. When the processing of S344 is over, the CPU 72 proceeds to S346. Also, when it is determined in S302 that the selected character string coincides with the last time folder name, the CPU 72 proceeds to S346. Hereinafter, the selected character string (i.e., the last time folder name included in the last time information) of this case is also referred to as 'selected folder name', and the folder ID (i.e., the last time folder ID included in the last time information) corresponding to the selected folder name is also referred to as 'selected folder ID'.

In S346, the CPU 72 supplies an authority confirmation request to the SP server 110 through the Internet 4. The authority confirmation request is a command for confirming whether there is an authority to write data in a folder having the selected folder name, and includes the target access token and the selected folder ID.

When the authority confirmation request is received from the relay server 50, the SP server 110 specifies the target user account information corresponding to the target access token. Then, when there is a normal folder having the selected folder ID in each normal folder associated with the target user account information, the SP server 110 determines 'writable'. Also, when the selected folder ID exists in the writable folder IDs included in the business user information (see FIG. 2) associated with the target user account information, the SP server 110 determines 'writable', and when the selected folder ID does not exist in the writable folder IDs, the SP server 110 determines 'unwritable'. Then, the SP server 110 supplies a response including the information indicating the determination result (i.e., 'writable' or 'unwritable') to the relay server 50 through the Internet 4.

In S348, when the response is received from the SP server 110, the CPU 72 of the relay server 50 determines whether the response includes the information indicating 'writable'. When the response includes the information indicating 'unwritable' (NO in S348), the CPU 72 proceeds to S350. When the response includes the information indicating 'writable' (YES in S348), the CPU 72 proceeds to S352.

In S350, the CPU 72 supplies error information to the scanner 10 through the Internet 4. When the processing of S350 is over, the processing of FIG. 6 is over.

When the error information is received from the relay server 50, the CPU 32 of the scanner 10 displays an error screen on the display unit 14. Thereby, the specific user can know that the scan data cannot be uploaded to the folder selected by the specific user.

In S352, the CPU 72 of the relay server 50 determines whether the selected folder name coincides with the last time folder name. When the selected folder name does not coincide with the last time folder name (NO in S352), the CPU 72 proceeds to S316. When the selected folder name coincides with the last time folder name (YES in S352), the CPU 72 proceeds to S330 without executing the processing of S316. The processing thereafter is the same as the above-described processing, except that the selected folder ID is used instead of the first folder ID.

(Specific Cases; FIGS. 7 to 10)

Subsequently, specific cases will be described with reference to FIGS. 7 to 10. The relay server 50 executes the flowchart of FIG. 6 to implement respective processing of FIGS. 7 to 10.

Figure 7:
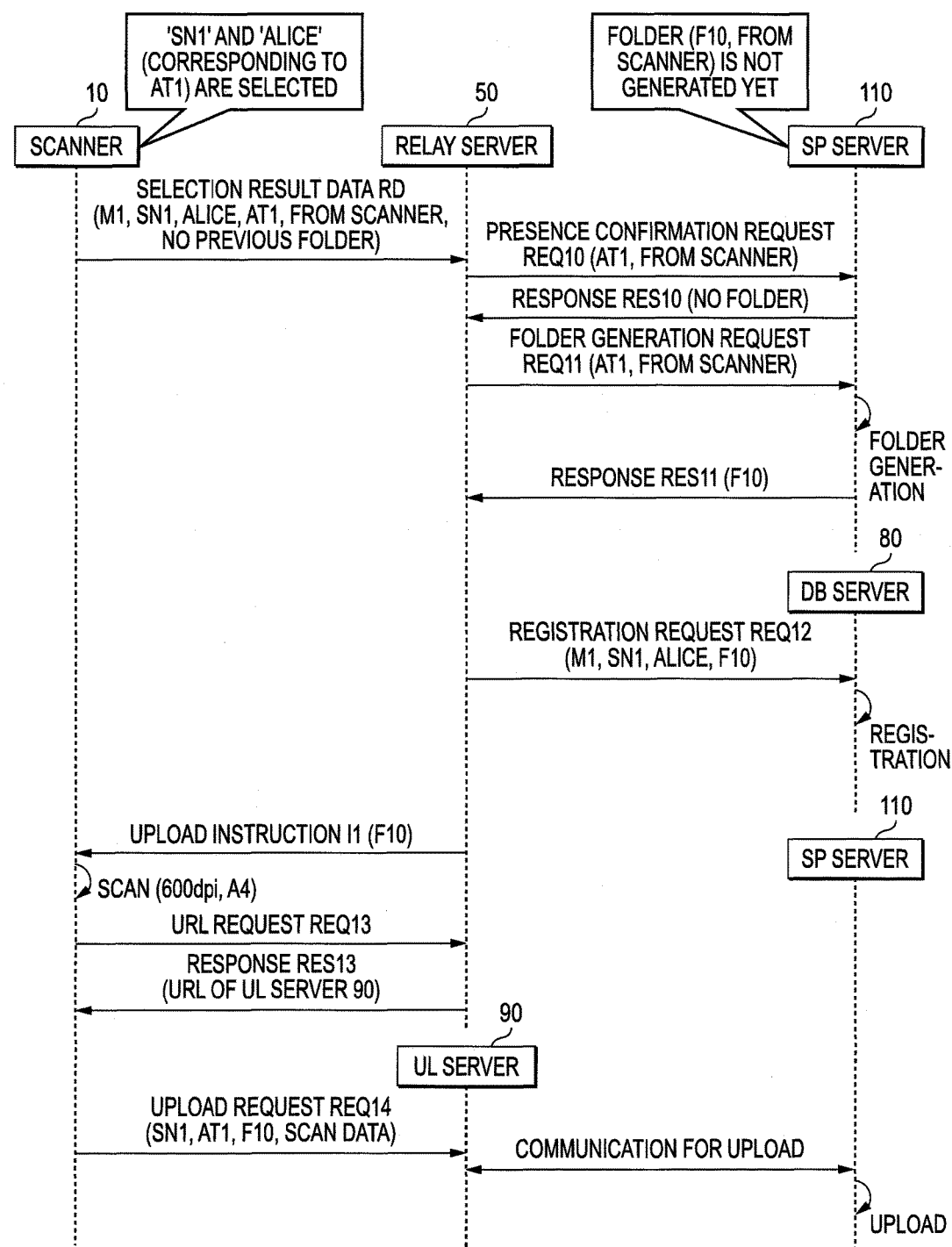
FIG. 7 is a sequence diagram of a case A where a new folder is generated in the service provision server.

(Case A; FIG. 7)

In a case A, the SP server 110 has not yet stored the normal folder (i.e., the normal folder having the folder name 'From Scanner') having the folder ID 'F10' of FIG. 2. In the scanner 10, the service name 'SN1' has been selected on the service selection screen SC1 of FIG. 3 and the display name 'Alice' has been selected on the display name selection screen SC2. Also, in the scanner 10, the item 'folder' and 'From Scanner' have been selected on the setting selection screen SC3 of FIG. 5. In this case, the selection result data RD supplied from the scanner 10 to the relay server 50 includes the MAC address 'M1', the service name 'SN1', the display name 'Alice', the selected character string 'From Scanner' and the last time folder information indicating 'there is no last time folder'.

When the selection result data RD is received from the scanner 10, the relay server 50 determines that the selected character string is 'From Scanner' and the selected character string does not coincide with the last time folder name (S302 of FIG. 6), and proceeds to S304. In this case, the relay server 50 supplies a presence confirmation request REQ10 including the access token 'AT1' and the selected character string 'From Scanner' to the SP server 110 (S304).

When the presence confirmation request REQ10 is received from the relay server 50, the SP server 110 supplies a response RES10 indicating 'no folder' to the relay server 50.

When the response RES10 is received from the SP server 110, the relay server 50 determines that the response RES10 indicates 'no folder' (NO in S310). In this case, the relay server 50 supplies a folder generation request REQ11 including the access token 'AT1' and the selected character string 'From Scanner' to the SP server 110 (S312).

When the folder generation request REQ11 is received from the relay server 50, the SP server 110 newly generates a normal folder having a folder name 'From Scanner' in association with the user account information UI1 (see FIG. 2) corresponding to the access token 'AT1'. Then, the SP server 110 supplies a response RES11 including a folder ID 'F10' of the normal folder to the relay server 50.

When the response RES11 is received from the SP server 110 (S314), the relay server 50 supplies a registration request REQ12 including the MAC address 'M1', the service name 'SN1', the display name 'Alice' and the folder ID 'F10' to the DB server 80 (S316).

The DB server 80 receives the registration request REQ12 from the relay server 50, and newly registers the folder information, which includes the respective information (i.e., 'M1', 'SN1', 'Alice' and 'F10') included in the registration request REQ12, in the folder table 82. Since the folder information is registered in this way, when the scanner 10 should execute a next scan UL in accordance with an instruction of the same user as the user at this time, the relay server 50 can receive the folder ID 'F10' from the DB server (see the request REQ2 and the response RES2 of FIG. 3) and preferentially display the last time folder name 'From Scanner' on the scanner 10 (see S110 of FIG. 4).

Then, the relay server 50 supplies an upload instruction I1 including the folder ID 'F10' to the scanner 10 (S330).

When the upload instruction I1 is received from the relay server 50, the scanner 10 executes a scan operation in accordance with the resolution and document size (i.e., '600 dpi' and 'A4') selected on the setting selection screen SC3 of FIG. 5, thereby generating scan data. Then, the scanner 10 supplies a URL request REQ13 to the relay server 50.

When the URL request REQ13 is received from the scanner 10 (S332), the relay server 50 supplies a response RES13 including a URL of the UL server 90 to the scanner 10 (S334).

When the response RES13 is received from the relay server 50, the scanner 10 supplies an upload request REQ14 including the service name 'SN1', the access token 'AT1', the folder ID 'F10' and the scan data to the relay server 50.

When the upload request REQ14 is received from the scanner 10, the UL server 90 performs communication for upload with the SP server 110 to store the scan data (i.e., a file) in the normal folder having the folder ID 'F10' (i.e., the normal folder having the folder name 'From Scanner').

Figure 8:
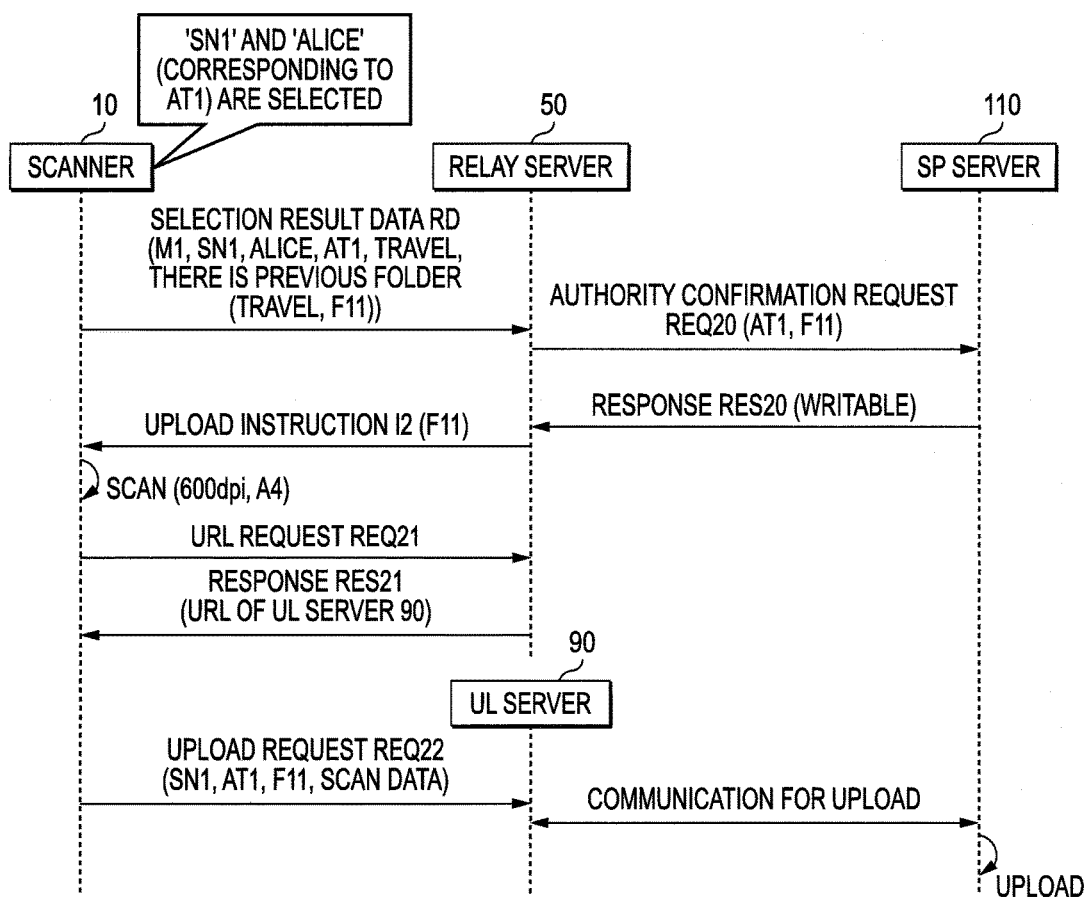
FIG. 8 is a sequence diagram of a case B where a last time folder is selected.

(Case B; FIG. 8)

In a case B, the content of the selection result data RD supplied from the scanner 10 to the relay server 50 is different from the case A. The selection result data RD includes the selected character string 'Travel' and the last time folder information indicating 'there is a last time folder'. The last time folder information includes the last time folder name 'Travel' and the last time folder ID 'F11'. That is, in the case B, the character string 'Travel' coinciding with the last time folder name 'Travel' has been selected on the setting selection screen SC3.

When the selection result data RD is received from the scanner 10, the relay server 50 determines that the selected character string 'Travel' coincides with the last time folder name 'Travel' (S302 of FIG. 6), and proceeds to S346. In this case, the relay server 50 supplies an authority confirmation request REQ20 including the access token 'AT1' and the selected folder ID 'F11' to the SP server 110 (S346). The reason to re-confirm whether the folder, which was writable in the last time scan UP, is writable is as follows. That is, when the folder is a business folder, there is a possibility that the folder may be changed to an unwritable folder by the manager after the last time scan UL.

As shown in FIG. 2, there is a normal folder having the selected folder ID 'F11' in association with the user account information UI1. For this reason, when the authority confirmation request REQ20 is received from the relay server 50, the SP server 110 supplies a response RES20 indicating 'writable' to the relay server 50.

When the response RES20 is received from the SP server 110, the relay server 50 determines that the response RES20 indicates 'writable' (YES in S348). The relay server 50 further determines that the selected folder 'Travel' coincides with the last time folder name 'Travel' (YES in S352), and supplies an upload instruction I2 including the selected folder ID 'F11' to the scanner 10 without executing the registration with the DB server 80 (i.e., without executing S316) (S330). The respective processing thereafter (a REQ21, a response RES21, a request REQ22 and the like) is the same as the case A of FIG. 7, except that the folder ID 'F11' is used instead of the folder ID 'F10'.

Figure 9:
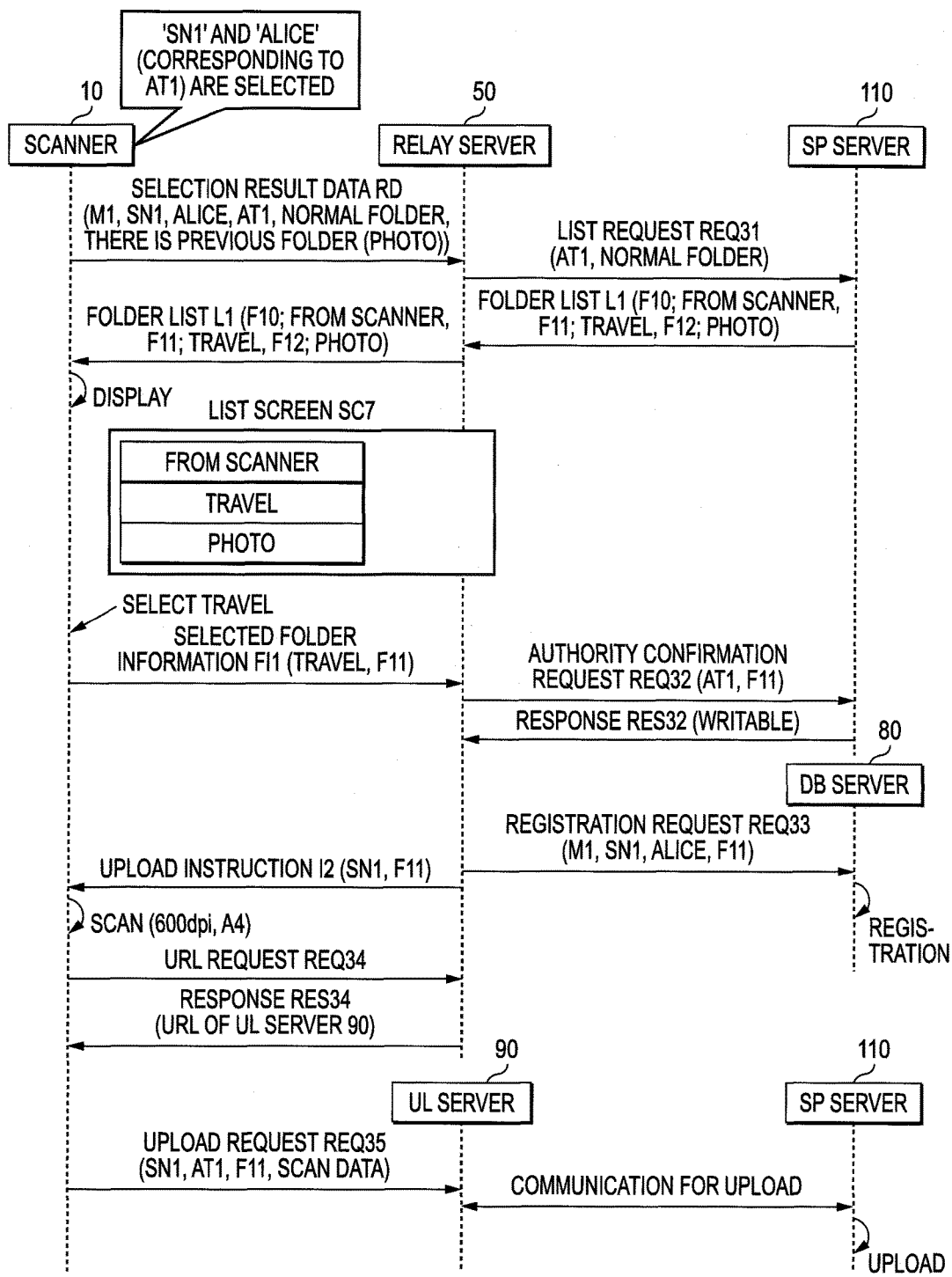
FIG. 9 is a sequence diagram of a case C where a folder different from the last time folder is selected.

(Case C; FIG. 9)

In a case C, the content of the selection result data RD supplied from the scanner 10 to the relay server 50 is different from the case A. The selection result data RD includes the selected character string 'Normal Folder' and the last time folder information indicating 'there is a last time folder'. The last time folder information includes the last time folder name 'Photo' and the last time folder ID 'F12'. That is, in the case C, the character string 'Normal Folder', which does not coincide with the last time folder name 'Photo', has been selected on the setting selection screen SC3.

When the selection result data RD is received from the scanner 10, the relay server 50 determines that the selected character string is 'Normal Folder' (S302 of FIG. 6), and proceeds to S340. In this case, the relay server 50 supplies a list request REQ31 including the access token 'AT1' and the selected character string 'Normal Folder' to the SP server 110 (S340).

When the list request REQ31 is received from the relay server 50, the SP server 110 specifies the respective folder information (i.e., the folder ID and the folder name) of the respective normal folders associated with the user account information UI1 corresponding to the access token 'AT1'. Then, the SP server 110 supplies a folder list L1 including the respective folder information to the relay server 50.

When the folder list L1 is received from the SP server 110, the relay server 50 supplies the folder list L1 to the scanner 10 (S342).

When the folder list L1 is received from the relay server 50, the scanner 10 displays a list screen SC7 indicating the respective folder names in the folder list L1. In the case C, the folder name 'Travel' is selected by the user. In this case, the scanner 10 supplies selected folder information FI1 including the selected folder name 'Travel' and the selected folder ID 'F11' to the relay server 50.

When the selected folder information FI1 is received from the scanner 10 (S344), the relay server 50 supplies an authority confirmation request REQ32 including the access token 'AT1' and the selected folder ID 'F11' to the SP server 110 (S346).

When the authority confirmation request REQ32 is received from the relay server 50, the SP server 110 supplies a response RES32 indicating 'writable' to the relay server 50.

When the response RES32 is received from the SP server 110, the relay server 50 determines that the response RES32 indicates 'writable' (YES in S348), and also determines that the selected folder name 'Travel' does not coincide with the last time folder name 'Photo' (NO in S352). In this case, the relay server 50 supplies a registration request REQ33 including the MAC address 'M1', the service name 'SN1' and the display name 'Alice' and the folder ID 'F11' to the DB server 80 (S316). The respective processing thereafter (an instruction I2, a request REQ34, a response RES34, a request REQ35 and the like) is the same as the case A of FIG. 7, except that the folder ID 'F11' is used instead of the folder ID 'F10'.

Figure 10:
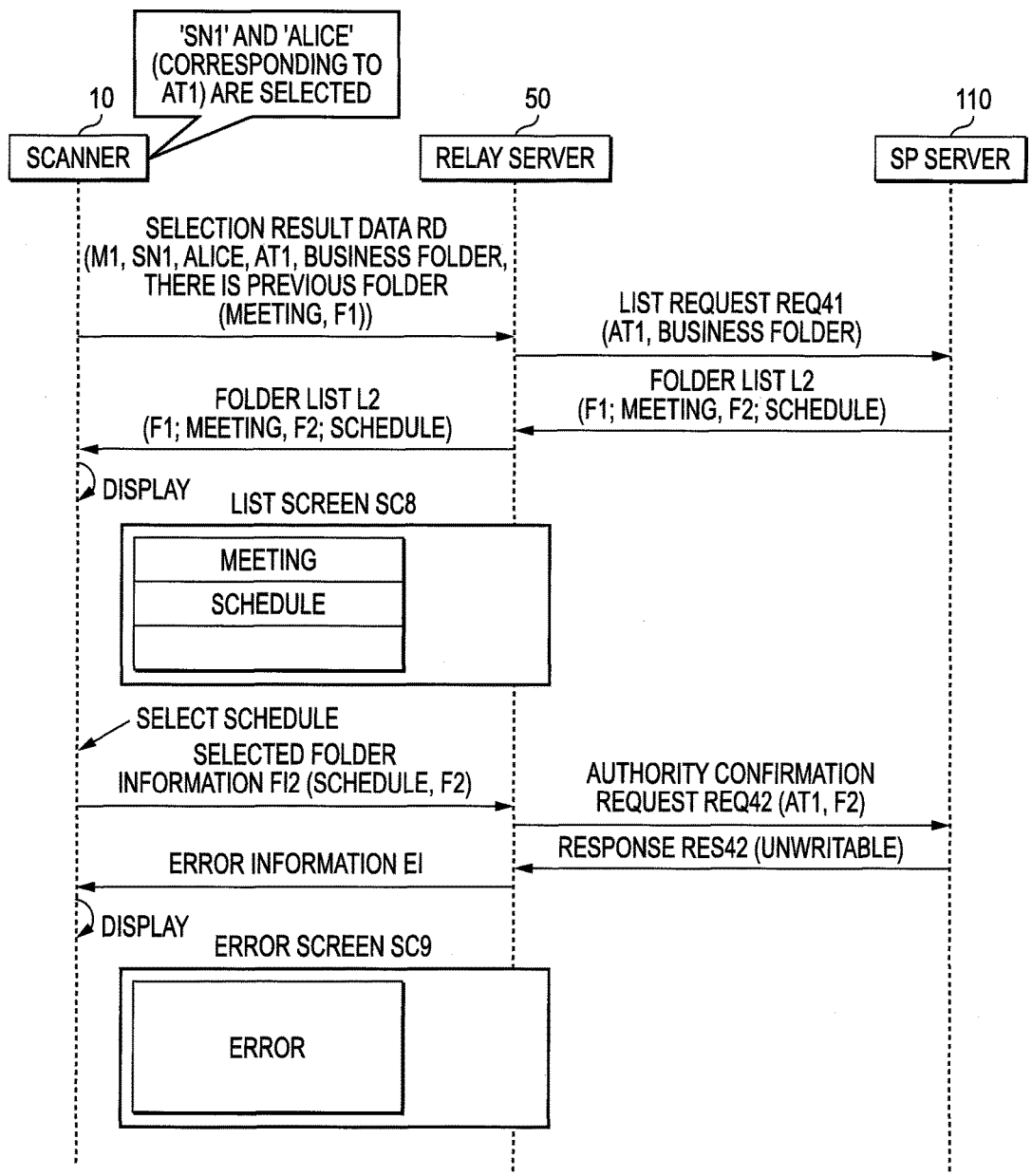
FIG. 10 is a sequence diagram of a case D where an unwritable folder is selected.

(Case D; FIG. 10)

In a case D, the content of the selection result data RD supplied from the scanner 10 to the relay server 50 is different from the case A. The selection result data RD includes the selected character string 'Business Folder' and the last time folder information indicating 'there is a last time folder'. The last time folder information includes the last time folder name 'Meeting' and the last time folder ID 'F1'. That is, in the case D, the character string 'Business Folder', which does not coincide with the last time folder name 'Meeting', has been selected on the setting selection screen SC3 of FIG. 5.

When the selection result data RD is received from the scanner 10, the relay server 50 determines that the selected character string is 'Business Folder' (S302 of FIG. 6), and proceeds to S340. In this case, the relay server 50 supplies a list request REQ41 including the access token 'AT1' and the selected character string 'Business Folder' to the SP server 110 (S340).

When the list request REQ41 is received from the relay server 50, the SP server 110 specifies the respective folder information (i.e., the folder ID and the folder name) of the respective business folders associated with the user account information UI1 corresponding to the access token 'AT1'. Then, the SP server 110 supplies a folder list L2 including the respective folder information to the relay server 50.

When the folder list L2 is received from the SP server 110, the relay server 50 supplies the folder list L2 to the scanner 10 (S342).

When the folder list L2 is received from the relay server 50, the scanner 10 displays a list screen SC8 indicating the respective folder names in the folder list L2. In the case D, the folder name 'Schedule' is selected by the user. In this case, the scanner 10 supplies selected folder information FI2 including the selected folder name 'Schedule' and the selected folder ID 'F2' to the relay server 50.

When the selected folder information FI2 is received from the scanner 10 (S344), the relay server 50 supplies an authority confirmation request REQ42 including the access token 'AT1' and the selected folder ID 'F2' to the SP server 110 (S346).

As shown in FIG. 2, there is no folder ID 'F2' in the writable folder IDs associated with the user account information UI1. For this reason, when the authority confirmation request REQ42 is received from the relay server 50, the SP server 110 supplies a response RES42 indicating 'unwritable' to the relay server 50.

When the response RES42 is received from the SP server 110, the relay server 50 determines that the response RES42 indicates 'unwritable' (NO in S348) and supplies error information EI to the scanner 10 (S350).

When the error information EI is received from the relay server 50, the scanner 10 displays an error screen SC9. Thereby, the user can know that the upload of the scan data to the selected folder cannot be executed.

(Effects of First Illustrative Embodiment)

As shown in FIG. 3, according to the first illustrative embodiment, when the setting screen request REQ1 is received from the scanner 10, the relay server 50 receives the last time folder ID from the DB server 80 (see the response RES2). The relay server 50 further supplies the information request REQ3 including the last time folder ID to the SP server 110, thereby receiving the last time folder name from the SP server 110 (see the response RES3). Then, the relay server 50 supplies the setting screen data SD (see S110 of FIG. 4) including the last time folder name as the default folder name to the scanner 10. Thereby, in the scanner 10, the last time folder name is displayed and the other folder names are not displayed on the setting selection screen SC3 of FIG. 5. That is, the last time folder name is preferentially displayed than the other folder names. Therefore, the user can know the folder name (i.e., the last time folder name) of the target folder of the last time scan UL, and can easily select the same folder as the target folder of the last time scan UL as the target folder of the current scan UL, for example.

In particular, the relay server 50 is configured to receive the last time folder ID from the DB server 80 which is separately configured from the SP server 110. Therefore, even when the SP server 110 stores therein the last time folder ID or last time folder name but cannot supply the last time folder ID or last time folder name to the outside, the relay server 50 can appropriately receive the last time folder ID from the DB server 80. Also, the relay server 50 is configured to receive the last time folder ID from the DB server 80 which is separately configured from the scanner 10. Therefore, it is not necessary to store the last time folder ID or last time folder name in the memory 34 of the scanner 10. For this reason, it is possible to reduce a load of the memory 34 of the scanner 10 having a smaller memory capacity than the PC and the like.

(Correspondence Relation)

The scanner 10, the SP server 110 and the DB server 80 are examples of a 'communication apparatus', a 'service provision server' and a 'database', respectively. The scan UL instruction of FIG. 3 is an example of 'a predetermined instruction'. The setting screen request REQ1 of FIG. 3, the setting screen data SD and the respective selection screens SC3 to SC6 of FIG. 5 are examples of a 'request for specific screen data', 'specific screen data' and 'one or more selection screens', respectively. The user account information UI1 of FIG. 2 is an example of 'specific account information'. In this case, the respective folders having the folder IDs 'F1', 'F2', 'F10', 'F11', 'F12' are an example of 'a plurality of folders'. The last time folder ID in the response RES2 of FIG. 3 is an example of 'first folder relation information' and 'folder identification information'. The last time folder name in the response RES3 is an example of a 'folder name of a first folder'. The folder name 'Travel' selected on the list screen SC7 of FIG. 9 is an example of 'second folder relation information'. Also, the normal folder and the business folder are examples of 'a first type of folder' and 'a second type of folder', respectively.

In FIG. 3, the processing of receiving the setting screen request REQ1, the processing of receiving the response RES2, the processing of receiving the response RES3, the setting screen data generation processing of S100 and the processing of supplying the setting screen data SD are examples of 'receiving a request for specific screen data', 'receiving first folder relation information', 'receiving folder name of the first folder', 'generating the specific screen data' and 'supply the generated specific screen data', respectively. Also, the processing of S316 in FIG. 6 is an example of 'registering second folder relation information'.

Figure 11:
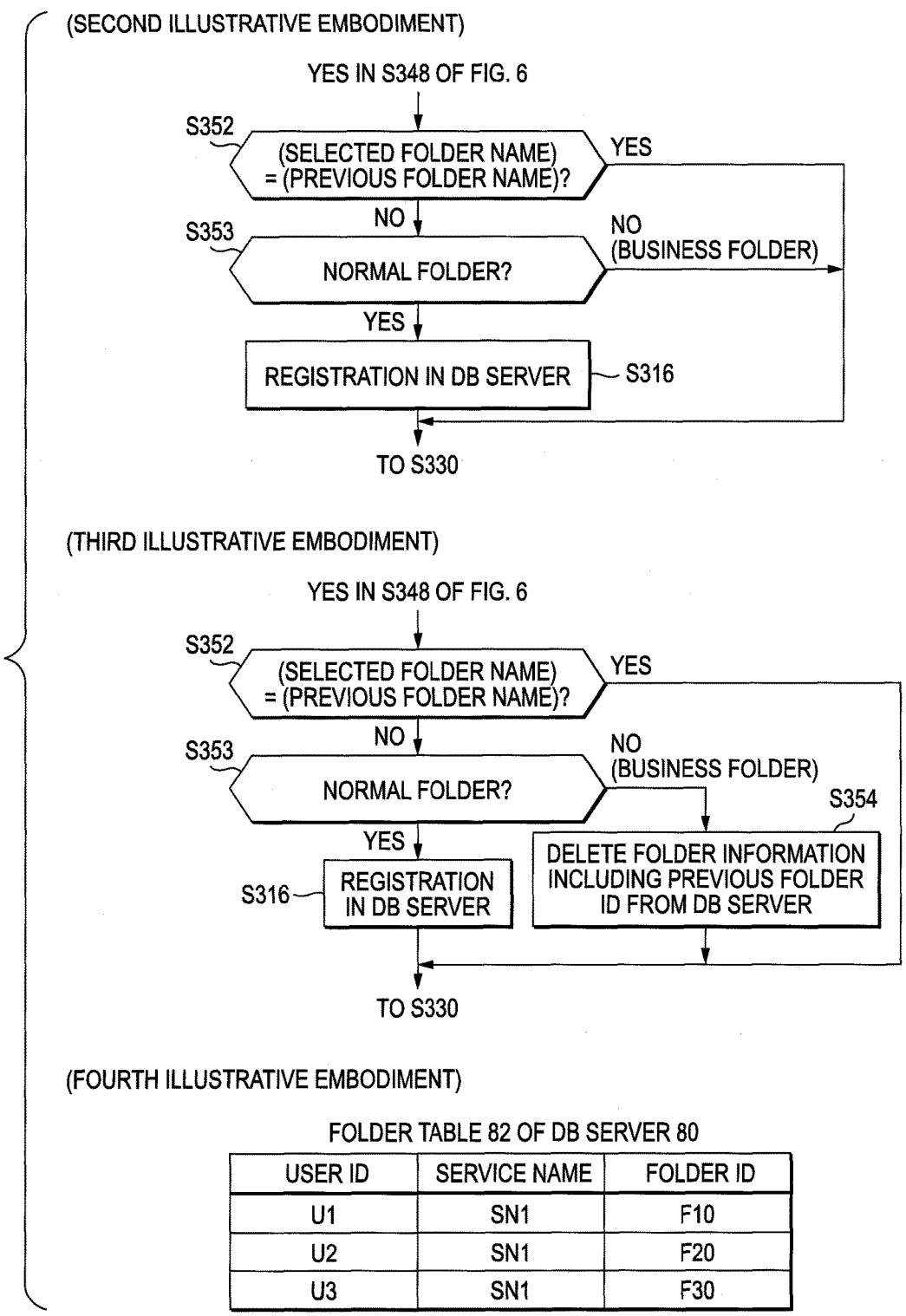
FIG. 11 illustrates second to fourth illustrative embodiments.

(Second Illustrative Embodiment; FIG. 11)

In this illustrative embodiment, a part of the response processing of FIG. 6 is different from the first illustrative embodiment. In the first illustrative embodiment, the folder ID is newly registered in the DB server 80, irrespective of whether the folder selected by the specific user is the normal folder or business folder (see S316 of FIG. 6). However, there is a possibility that the business folder is a folder having high confidentiality for storing a file to be used for a company business, for example. When the information related to the business folder is registered in the DB server 80 which is irrelevant to the corresponding company, or is displayed on the display unit 14 of the scanner 10, the confidentiality of the business folder may be deteriorated. In order to avoid this situation, according to this illustrative embodiment, when a folder (hereinafter, referred to as 'selected folder') selected on the list selection screen SC7 or SC8 of FIG. 9 or 10 by the specific user is the normal folder, the folder ID is registered in the DB server 80, but when the selected folder is the business folder, the folder ID is not registered in the DB server 80.

In this illustrative embodiment, when the response RES3 (see FIG. 3) supplied from the SP server 110 to the relay server 50 includes a last time folder name, the response RES3 further includes type information indicating whether the last time folder is the normal folder or business folder. Also, when the setting screen data SD (see FIGS. 3 and 5) supplied from the relay server 50 to the scanner 10 includes the last time folder information indicating 'there is a last time folder', the setting screen data SD further includes the type information. Also, the selection result data RD (see FIGS. 3 and 5) supplied from the scanner 10 to the relay server 50 includes the type information.

As shown in FIG. 11, when a determination result in S352 is NO, the CPU 72 of the relay server 50 determines in S353 whether the selected folder is the normal folder or business folder by using the type information in the selection result data RD. When the selected folder is the normal folder (YES in S353), the CPU 72 newly registers the selected folder ID in the DB server 80, in S316. On the other hand, when the selected folder is the business folder (NO in S353), the CPU 72 skips over S316 (i.e., the CPU 72 does not newly register the selected folder ID in the DB server 80). However, even in this case, the CPU 72 maintains the state where the last time folder ID is registered in the DB server 80, without deleting the last time folder ID from the DB server 80.

According to this illustrative embodiment, when the selected folder is the business folder, the selected folder ID is not registered in the DB server 80. For this reason, it is possible to suppress the information related to the business folder from being registered in the DB server 80 or being displayed on the display unit 14 of the scanner 10. Therefore, it is possible to suppress the confidentiality of the business folder from being deteriorated. Further, even when the selected folder is the business folder, the last time folder ID is not deleted from the DB server 80. For this reason, when a scan UL instruction is next time provided to the scanner 10 by the specific user and thus the relay server 50 again receives the setting screen request from the scanner 10, the relay server 50 can preferentially display a folder name of the normal folder having the last time folder ID (i.e., the normal folder selected by the specific user at the time before last) on the scanner 10.

(Third Illustrative Embodiment; FIG. 11)

As shown in FIG. 11, a third illustrative embodiment is different from the second illustrative embodiment in that, when it is determined in S353 that the selected folder is the business folder (NO in S353), processing of S354 is executed. In S354, the CPU 72 of the relay server 50 supplies a deletion request including the respective information (i.e., 'M1', 'SN1' and the target display name) in the selection result data RD (see FIGS. 3 and 5) to the DB server 80 through the Internet 4. As a result, the DB server 80 deletes the folder information including the respective information (i.e., the folder information including the last time folder ID) from the folder table 82.

According to this illustrative embodiment, when the selected folder is the business folder, the folder information including the last time folder ID is deleted from the DB server 80. As a result, when a scan UL instruction is next time provided to the scanner 10 by the specific user and thus the relay server 50 again receives the setting screen request from the scanner 10, the relay server 50 receives the response RES2 (see FIG. 3) indicating 'no registration' from the DB server 80. In this case, the relay server 50 determines 'From Scanner' as the default folder name (YES in S106 of FIG. 4, S108) and can preferentially display the folder name 'From Scanner' on the scanner 10.

(Fourth Illustrative Embodiment; FIG. 11)

In a fourth illustrative embodiment, the content of the folder table 82 (see FIG. 1) of the DB server 80 is different from the first illustrative embodiment. As shown in FIG. 11, the folder table 82 does not have the columns in which the MAC address and the display name are written, and is instead provided with a column in which the user ID (for example, 'U1' and the like) included in the user account information (for example, UI1 of FIG. 2) used for the SP server 110 is written. That is, the respective folder information in the folder table 82 is information in which the user ID, the service name and the last time folder ID are associated.

When the setting screen request REQ1 (see FIG. 3) is received from the scanner 10, the CPU 72 of the relay server 50 supplies the target access token in the setting screen request REQ1 to the SP server 110, thereby receiving the target user account information corresponding to the target access token from the SP server 110. The CPU 72 supplies the last time folder request REQ2, which includes the target user ID included in the target user account information and the service name 'SN1' in the setting screen request REQ1, to the DB server 80. Thereby, the CPU 72 receives the response RES2 including the last time folder ID associated with the service name and target user ID from the DB server 80. Also, in S316 of FIG. 6, the CPU 72 registers the selected folder ID in the DB server 80 while being associated the selected folder ID with the target user ID and service name 'SN1', without registering the MAC address of the scanner 10 and the target display name in the DB server 80.

As described above, according to the fourth illustrative embodiment, the device identification information (for example, the MAC address) for identifying the device (for example, the scanner 10) in which the folder selection is executed is not registered in the DB server 80. For example, a situation is assumed in which the specific user registers the access token corresponding to the same user account information UI1 in the respective service tables 38 of the scanner 10 and the other scanners. In this case, for example, as the specific user selects a specific folder on the scanner 10, a folder ID of the specific folder is registered in the DB server 80 (S316 of FIG. 6). Thereafter, when a scan UL instruction is provided to another scanner by the specific user and thus the relay server 50 receives the setting screen request from the other scanner, the relay server 50 receives the folder ID of the specific folder from the DB server 80. For this reason, the relay server 50 preferentially displays the folder name of the specific folder on the other scanner. That is, the specific user can know the folder name of the target folder of the last time scan UL, irrespective of which scanner is used to execute the current scan UL.

Although the illustrative embodiments of the present invention have been described in detail, the illustrative embodiments are just exemplary and do not limit the scope of the claims. The technology defined in the claims also includes a variety of changes and modifications of the above-described illustrative embodiments. For example, following modified embodiments are included.

(First Modified Embodiment)

In the above illustrative embodiments, the CPU 72 of the relay server 50 displays the setting selection screen SC3 (see FIG. 5), which includes the last time folder name and does not include the other folder names, on the scanner 10. However, the method of preferentially displaying the last time folder name is not limited thereto. For example, the CPU 72 may display the setting selection screen SC3 (see FIG. 5), which includes both the last time folder name and the other folder names, on the scanner 10. In this case, the CPU 72 may generate the setting screen data SD so that the last time folder name is arranged at the top. Also, the CPU 72 may generate the setting screen data SD so that a color of the last time folder name is different from colors of the other folder names. Generally speaking, it is necessary that the relay server generates specific screen data for preferentially displaying a folder name of a first folder than the folder names of the other folders on the display unit of the communication apparatus.

(Second Modified Embodiment)

In the above illustrative embodiments, the CPU 72 of the relay server 50 newly registers the last time folder ID in the DB server 80 in S316 of FIG. 6 or 11. Instead of this configuration, the CPU 72 may newly register the last time folder name in the DB server 80. Thereby, when the CPU 72 supplies the last time folder request REQ2 (see FIG. 3) to the DB server 80, the CPU 72 can receive the response RES2 including the last time folder name from the DB server 80. Also in this modified embodiment, the CPU 72 can preferentially display the last time folder name on the scanner 10. In this modified embodiment, the last time folder name is an example of the 'first folder relation information'. Generally speaking, the 'first folder relation information' may be information (for example, a folder ID) different from the folder name of the first folder, like the above illustrative embodiments, or may be the same information as the folder name of the first folder.

(Third Modified Embodiment)

The DB server 80 may store therein a folder of the most selected folder among the plurality of folders selected in the past by the specific user ID (hereinafter, referred to as 'maximum folder ID'), instead of storing the last time folder ID. In this case, when the setting screen request REQ1 (see FIG. 3) is received from the scanner 10, the CPU 72 of the relay server 50 can receive the maximum folder ID from the DB server 80 and preferentially display a folder name of the folder having the maximum folder ID on the scanner 10. In this modified embodiment, the maximum folder ID is an example of the 'first folder identification information'. Generally speaking, it is only necessary that the 'first folder' is a target folder of past data communication.

(Fourth Modified Embodiment)

In the above illustrative embodiments, the DB server 80 is separately configured from the relay server 50. Instead of this configuration, the memory 74 of the relay server 50 may be configured to store therein the folder table 82. In this case, when the setting screen request REQ1 (see FIG. 3) is received from the scanner 10, the CPU 72 of the relay server 50 receives the last time folder ID from the folder table 82 in the memory 74. Also, in S316 of FIG. 6, the CPU 72 newly registers the selected folder ID in the folder table 82 of the memory 74. That is, it is only necessary that the 'database' is separately configured from the service provision server and the communication apparatus, and the 'database' may be configured separately from the relay server like the above illustrative embodiments, or may be configured integrally with the relay server like this modified embodiment.

(Fifth Illustrative Embodiment)

In the above illustrative embodiments, when the specific user should select a folder in the SP server 110 so that the scanner 10 can upload the scan data to the SP server 110, the last time folder name is preferentially displayed on the scanner 10. The technology of the illustrative embodiments can be applied to not only a situation where the upload of the scan data to the SP server 110 should be executed but also a situation where download of data from the SP server 110 should be executed, for example. For example, when a download printing instruction is provided to a printer by the specific user, the CPU 72 of the relay server 50 receives a request for screen data from the printer. In this case, like the above illustrative embodiments, the CPU 72 receives the folder ID from the DB server 80. The folder ID is a folder ID of a target folder of past download, which was executed by the printer so as to receive a data supply service from the SP server 110 as the download printing instruction was provided in the past to the printer by the specific user. Then, the CPU 72 preferentially displays a folder name of a folder having the corresponding folder ID on the printer. In this modified embodiment, the printer is an example of the 'communication apparatus'. In the meantime, the 'communication apparatus' is not limited to the scanner and the printer and may be other devices (for example, a multifunctional apparatus, a FAX apparatus, a PC and the like) from which a target folder of the data communication with the service provision server is selected.

(Sixth Modified Embodiment)

The 'second type of folder' is not limited to the business folder and may be another type of folder that is allowed to be accessed in accordance with a plurality of account information (for example, a folder referred to as a so-called 'shared folder').

(Seventh Modified Embodiment)

In the fourth illustrative embodiment (see FIG. 11), the user ID included in the user account information used for the SP server 110 is registered in the folder table 82 of the DB server 80. Instead of this configuration, the other user identification information (for example, the user ID allotted to the user using the relay server 50, and the like) may be registered in the folder table 82. That is, the 'user identification information' may be any information as long as it is information for identifying a user.

(Eighth Illustrative Embodiment)

In the above illustrative embodiments, the relay server 50 and the UL server 90 are separately configured. However, they may be integrally configured. In this modified embodiment, the integrally configured server is an example of the 'relay server'.

(Ninth Modified Embodiment)

In the above illustrative embodiments, the CPU 72 of the relay server 50 executes the processing in accordance with the software (i.e., the program 76), thereby implementing the respective processing of FIGS. 3, 4, 6 and the like. Instead of this configuration, at least one of the respective processing may be implemented by hardware such as a logical circuit.

Also, the technical elements described in the specification or drawings exhibit the technical usefulness individually or by a variety of combinations and are not limited to combinations defined in the claims at the time of the filing of the subject application. Also, the technologies described in the specification or drawings accomplish a plurality of purposes at the same time, and one accomplishment of the purposes also has the technical usefulness.

What is claimed is:

1. A relay server configured to relay service provision from a service provision server to a communication apparatus, the relay server comprising:

a processor; and a memory storing an application program interface (API) for the service provision server, and instructions that, when executed by the processor, cause the relay server to perform:

receiving folder selection information from the communication apparatus, the folder selection information indicating a first folder;

registering the received folder selection information indicating the first folder in a database, the database being different from the service provision server and the communication apparatus, and the database being connected with the relay server via Internet;

receiving a request for selection screen data from the communication apparatus through the Internet in a case that a predetermined instruction is provided to the communication apparatus by a specific user, the request comprising an identifier of the specific user and an identifier of the service, the selection screen data indicating a selection screen by which the specific user selects a folder;

transmitting to the database through the Internet, in response to receiving the request for the selection screen data, a request for history information, the request comprising the identifier of the specific user and the identifier of the service;

receiving, from the database through the Internet, first folder history information corresponding to the specific user by communicating with the database, the first folder history information identifying the first folder indicated by the registered folder selection information, the service provision server comprising a plurality of folders, the plurality of folders comprising one or more folders capable of being accessed by the specific user, the one or more folders comprising the first folder, and the first folder being a folder which has been previously accessed in the past by the specific user in response to an instruction from the specific user;

transmitting an information request to the service provision server through the Internet using the API, the information request comprising the first folder history information corresponding to the specific user received from the database;

receiving, from the service provision server through the Internet using the API, a plurality of folder names including a folder name of the first folder and a folder name of a second folder in response to the transmission of the information request, the service provision server being different from the database and the communication apparatus;

generating the selection screen data such that the folder name of the first folder is preferentially displayed on the display unit of the communication apparatus than the folder name of the second folder, and supplying the generated selection screen data to the communication apparatus through the Internet, the selection screen data being usable by the specific user for selecting a folder among the folders including the first folder and the second folder.

2. The relay server according to claim 1, wherein the first folder is a target folder of a previous time data communication, which was performed by the communication apparatus so as to receive the service in a case that the predetermined instruction was provided to the communication apparatus by the specific user at a previous time, and wherein the instructions stored in the memory, when executed by the processor, cause the relay server to further perform:

registering second folder history information corresponding to the specific user in the database in a case that a second folder is selected on the communication apparatus by the specific user from a plurality of folders after the selection screen data is supplied to the communication apparatus, the plurality of folders comprising the second folder, the second folder being different from the first folder, and the second folder history information indicating the second folder.

3. The relay server according to claim 2, wherein the registering registers the second folder history information in the database irrespective of whether the second folder is a first type of folder or a second type of folder different from the first type of folder, wherein the first type of folder is a folder that is allowed to be accessed in accordance with only specific account information corresponding to the specific user, and wherein the second type of folder is a folder that is allowed to be accessed in accordance with the specific account information and also in accordance with account information different from the specific account information.

4. The relay server according to claim 2, wherein the registering registers the second folder history information in the database when the second folder is a first type of folder, wherein the registering does not register the second folder history information in the database when the second folder is a second type of folder different from the first type of folder, wherein the first type of folder is a folder that is allowed to be accessed in accordance with only specific account information corresponding to the specific user, and wherein the second type of folder is a folder that is allowed to be accessed in accordance with the specific account information and also in accordance with account information different from the specific account information.

5. The relay server according to claim 4, wherein the registering registers the second folder history information in place of the first folder history information when the second folder is the first type of folder, and wherein the registering maintains a state where the first folder history information is registered in the database without deleting the first folder history information from the database when the second folder is the second type of folder.

6. The relay server according to claim 2, wherein the registering registers user identification information for identifying a user of the communication apparatus and the second folder history information, which are associated with each other, in the database without registering device identification information for identifying the communication apparatus in the database.

7. A non-transitory computer readable storage medium having a computer program stored thereon and readable by a computer of a relay server configured to relay service provision from a service provision server to a communication apparatus, the computer program, when executed by the computer, causing the relay server to perform operations comprising:

receiving folder selection information from the communication apparatus, the folder selection information indicating a first folder;

registering the received folder selection information indicating the first folder in a database, the database being different from the service provision server and the communication apparatus, and the database being connected with the relay server via Internet;

receiving a request for selection screen data from the communication apparatus through the Internet in a case that a predetermined instruction is provided to the communication apparatus by a specific user, the request comprising an identifier of the specific user and an identifier of the service, the selection screen data indicating a selection screen by which the specific user selects a folder;

transmitting to the database through the Internet, in response to receiving the request for the selection screen data, a request for history information, the request comprising the identifier of the specific user and the identifier of the service;

receiving, from the database through the Internet, first folder history information corresponding to the specific user by communicating with the database, the first folder history information identifying the first folder indicated by the registered folder selection information, the service provision server comprising a plurality of folders, the plurality of folders comprising one or more folders capable of being accessed by the specific user, the one or more folders comprising the first folder, and the first folder being a folder which has been previously accessed in the past by the specific user in response to an instruction from the specific user;

transmitting an information request to the service provision server through the Internet using an application program interface (API) for the service provision server stored in memory of the relay server, the information request comprising the first folder history information corresponding to the specific user received from the database;

receiving, from the service provision server through the Internet using the API, a plurality of folder names including a folder name of the first folder and a folder name of a second folder in response to the transmission of the information request, the service provision server being different from the database and the communication apparatus;

generating the selection screen data such that the folder name of the first folder is preferentially displayed on the display unit of the communication apparatus than the folder name of the second folder, and supplying the generated selection screen data to the communication apparatus through the Internet, the selection screen data being usable by the specific user for selecting a folder among the folders including the first folder and the second folder.

* * * * *